United States Patent
Matsunami et al.

(10) Patent No.: US 7,356,660 B2
(45) Date of Patent: Apr. 8, 2008

(54) STORAGE DEVICE

(75) Inventors: Naoto Matsunami, Hayama (JP); Koji Sonoda, Sagamihara (JP); Akira Yamamoto, Sagamihara (JP); Masafumi Nozawa, Odawara (JP); Masaaki Iwasaki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 306 days.

(21) Appl. No.: 11/121,998

(22) Filed: May 5, 2005

(65) Prior Publication Data
US 2005/0203964 A1    Sep. 15, 2005

Related U.S. Application Data

(63) Continuation of application No. 10/775,886, filed on Feb. 10, 2004.

(30) Foreign Application Priority Data
Mar. 27, 2003    (JP) .............................. 2003-086828

(51) Int. Cl.
*G06F 12/08* (2006.01)
(52) U.S. Cl. ..................... 711/165; 711/161; 711/170; 707/204; 707/205
(58) Field of Classification Search .................... None
See application file for complete search history.

(56) References Cited

U.S. PATENT DOCUMENTS

| | | | |
|---|---|---|---|
| 5,379,423 A | 1/1995 | Mutoh et al. | |
| 5,537,585 A | 7/1996 | Blickenstaff et al. | |
| 5,619,690 A | 4/1997 | Matsunami et al. | |
| 5,941,972 A | 8/1999 | Hoese et al. | |
| 5,956,750 A | 9/1999 | Yamamoto et al. | |
| 6,032,224 A * | 2/2000 | Blumenau | 711/117 |
| 6,041,381 A | 3/2000 | Hoese | |
| 6,065,087 A | 5/2000 | Keaveny et al. | |
| 6,098,129 A | 8/2000 | Fukuzawa et al. | |
| 6,209,023 B1 | 3/2001 | Dimitroff et al. | |
| 6,275,898 B1 | 8/2001 | DeKoning | |

(Continued)

FOREIGN PATENT DOCUMENTS

JP        09-259037        10/1997

(Continued)

OTHER PUBLICATIONS

"Infrastructure Briefs", Network World, May 26, 2003, p. 19.

(Continued)

*Primary Examiner*—Hyung S. Sough
*Assistant Examiner*—Kaushik Patel
(74) *Attorney, Agent, or Firm*—Mattingly, Stanger, Malur & Brundidge, P.C.

(57) ABSTRACT

A storage device is provided with a file I/O interface control device and a plurality of disk pools. The file I/O interface control device sets one of a plurality of storage hierarchies defining storage classes, respectively, for each of LUs within the disk pools, thereby forming a file system in each of the LUs. The file I/O interface control device migrates at least one of the files from one of the LUs to another one of the LUs of an optimal storage class, based on static properties and dynamic properties of each file.

9 Claims, 15 Drawing Sheets

U.S. PATENT DOCUMENTS

| | | | |
|---|---|---|---|
| 6,327,614 | B1 | 12/2001 | Asano et al. |
| 6,330,572 | B1* | 12/2001 | Sitka .......................... 707/205 |
| 6,446,141 | B1 | 9/2002 | Nolan et al. |
| 6,598,174 | B1 | 7/2003 | Parks et al. |
| 6,647,474 | B2 | 11/2003 | Yanai et al. |
| 6,654,830 | B1 | 11/2003 | Taylor et al. |
| 6,757,695 | B1 | 6/2004 | Noveck et al. |
| 6,810,462 | B2 | 10/2004 | Matsunami et al. |
| 6,922,761 | B2 | 7/2005 | O'Connell et al. |
| 6,938,039 | B1 | 8/2005 | Bober et al. |
| 6,947,940 | B2 | 9/2005 | Anderson et al. |
| 6,983,039 | B2 | 1/2006 | Ishikawa et al. |
| 2001/0054133 | A1 | 12/2001 | Murotani et al. |
| 2002/0062387 | A1 | 5/2002 | Yatziv |
| 2002/0147881 | A1* | 10/2002 | Pudipeddi et al. ............. 711/1 |
| 2002/0161855 | A1 | 10/2002 | Manczak et al. |
| 2003/0046270 | A1 | 3/2003 | Leung et al. |
| 2003/0061440 | A1 | 3/2003 | Elliott |
| 2003/0065898 | A1* | 4/2003 | Flamma et al. ............. 711/165 |
| 2003/0074523 | A1 | 4/2003 | Johnson |
| 2003/0154220 | A1* | 8/2003 | Cannon ...................... 707/204 |
| 2003/0182288 | A1 | 9/2003 | O'Connell et al. |
| 2003/0182525 | A1 | 9/2003 | O'Connell et al. |
| 2003/0225801 | A1 | 12/2003 | Devarakonda et al. |
| 2004/0010660 | A1* | 1/2004 | Konshak et al. ............ 711/114 |
| 2004/0044854 | A1 | 3/2004 | Gibble et al. |
| 2004/0083202 | A1 | 4/2004 | Mu et al. |
| 2004/0098394 | A1 | 5/2004 | Merritt et al. |
| 2004/0107315 | A1 | 6/2004 | Watanabe et al. |
| 2004/0139167 | A1 | 7/2004 | Edsall et al. |
| 2004/0143563 | A1 | 7/2004 | Saake et al. |
| 2004/0143648 | A1 | 7/2004 | Koning et al. |
| 2004/0162940 | A1 | 8/2004 | Yagisawa et al. |
| 2004/0199515 | A1 | 10/2004 | Penny et al. |
| 2004/0210724 | A1 | 10/2004 | Koning et al. |
| 2004/0260862 | A1 | 12/2004 | Anderson |
| 2005/0097126 | A1 | 5/2005 | Cabrera et al. |
| 2005/0120189 | A1 | 6/2005 | Black |
| 2005/0149528 | A1 | 7/2005 | Anderson et al. |
| 2005/0149671 | A1 | 7/2005 | Suzuki et al. |
| 2005/0172097 | A1 | 8/2005 | Voigt et al. |

FOREIGN PATENT DOCUMENTS

| | | |
|---|---|---|
| JP | 09-274544 | 10/1997 |
| JP | 09-297699 | 11/1997 |
| JP | 10/301720 | 11/1998 |
| JP | 2002-229740 | 8/2002 |
| WO | WO 02/069159 | 9/2002 |

OTHER PUBLICATIONS

H. Biggar, "Disk-Based Backup Options Multiply", INFOSTOR, vol. 6, No. 12, Dec. 2002, pp. 1, 14, 16.

"The IFT-6200 RAID Enclosure with Fibre-to-IDE Interface: The Peace of Mind of MAID, Coupled with the Cost Effectiveness of IDE", Business Wire, Jul. 18, 2001, p. 628.

Infortrend Web Page printed on Sep. 19, 2005 from web address: http://www.infortrend.com/main/2$_2$product/sata.s/asp.

H. Schrimpf, "Migration of Processes, Files and Virtual Devices in the MDX Operating System", ACM SIGOPS Operating Systems Review, vol. 29, Issue 2, Apr. 1995, pp. 70-81.

B. Gavish et al, "Dynamic File Migration in Distributed Computer Systems", Communications of the ACM, vol. 33, No. 2, Feb. 1990, pp. 177-189.

DiskXtender 5.4—Technical Product Overview, Product Information obtained from http://www.legato.com, dated 2003.

"External Doc Archive: Product Documentation", printout of webpage located at http://web1.legato.com/cgi-bin/catalog?sf=Releases&level=9-13.

"Data Manager System Guide" from website http://web1.legato.com/cgi-bin/catalog?sf=Releases&level=9-13, 481 pages, published Jan. 2003.

J. Moran et al, "The Restore-o-Mounter: The File Motel Revisited", Proceedings of the Usenix Summer 1993 Technical Conference, Jun. 1993.

B. Chronister, "OPEN/stor 2.0", Windows IT PRO, Dec. 1997, obtained online at http://www.windowsitpro.com/Articles/Print.cfm?ArticleID=211.

"VERITAS NetBackup Storage Migrator for UNIX v4.5", VERITAS White Paper, 2002.

M. Hope, "Users Tier Storage for ILM", INFOSTOR, Sep. 2005.

* cited by examiner

Fig. 8

Storage Class Management Table  /∼ 1100451

| Storage Class# (1100451a) | Storage Node# (1100451b) | Disk Pool# (1100451c) | LU# (1100451d) | LU Type (1100451e) | RAID Conf. (1100451f) | Usable Capacity (1100451g) | Used Capacity (1100451h) |
|---|---|---|---|---|---|---|---|
| OnLine Storage (Premium) | STR0 | PC Pool | LU0 | Local File | RAID1 1D+1P | 140GB | 53GB |
| OnLine Storage (Normal) | STR0 | FC Pool | LU1 | Local File | RAID5 4D+1P | 560GB | 125GB |
| NearLine Storage | STR0 | SATA Pool | LU2 | Local File | RAID5 8D+1P | 1120GB | 320GB |
| Archive Storage | STR1 | SATA Pool | LU3 | Remote File | RAID5 15D+1P | 2100GB | 480GB |
| Archive Storage | STR2 | SATA Pool | LU4 | Remote Block | RAID5 15D+1P | 2100GB | 480GB |

Fig. 11

File Property Information Management Table 1100438

| Property Information Type | Category | Attribute | Content |
|---|---|---|---|
| Static Property Information | File Information | File Type | Document |
| | | Application | XYZ Word |
| | | Date Created | 2002.11.25 |
| | | Owner | Smith |
| | | Access Identifier | -rw-rw-rw- |
| | Policy | Initial Storage Class | Not designated |
| | | Asset Value Type | Important |
| | | Life Cycle Model | Model 1 |
| | | Migration Plan | Plan 1 |
| Dynamic Property Information | Access Information | Time Stamp | 2003.1.1 |
| | | Access Count | 12 |
| | | Read Count | 7 |
| | | Write Count | 5 |
| | | Read Size | 7,168 |
| | | Write Size | 5,120 |
| | | Read Sequential Count | 6 |
| | | Write Sequential Count | 4 |
| | Life Cycle stage Information | Current Life Cycle | Reference Stage |
| | | Current Storage Class | NearLine |

Fig. 12

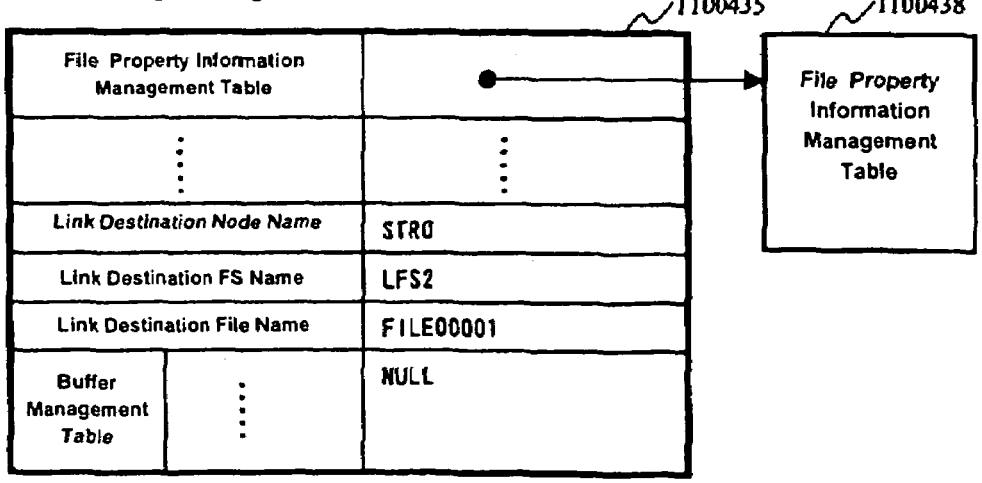

File Storage Management Table

STORAGE DEVICE

The present application is a continuation of application Ser. No. 10/775,886, filed Feb. 10, 2004, the contents of which are incorporated herein by reference.

BACKGROUND OF THE INVENTION:

1. Field of the Invention

The present invention relates to a storage device used in a computer system.

2. Related Background Art

In a conventional system, a high-speed storage device and a low-speed storage device may be connected to a computer called a hierarchical storage. In the system, files that are frequently used are stored in the high-speed storage device such as a magnetic disk device, while files that are not frequently used are stored in the inexpensive, low-speed storage device such as a tape device. Which files should be placed, i.e., stored, in which storage device is determined by using a table that manages access frequency of each file.

In another conventional system, a plurality of logical storage devices having different processing speeds and storage capacities are configured within a storage device that is connected to a computer and used. Such a system may be represented by disk array subsystems. In this system, the storage device manages as statistical information the frequency of accesses from the computer to data stored in the storage device, and, based on the statistical information, transfers data with high access frequency to logical storage devices with higher performance.

The first set of problems entailed in the prior art is that there is a high dependency on the computer connected to the storage device, that there is a limitation in the system configuration, and that it is difficult to simplify the system management.

In the conventional system described above, a hierarchical storage control is realized through software operating on the computer. The hierarchical storage control refers to a data storage control for controlling a plurality of storage regions having different processing speeds and storage capacities such that the storage regions can be changed according to the frequency of data usage. In other words, the hierarchical storage control refers to controlling to select, based on the property of data such as frequency of data usage, an appropriate storage region from among a plurality of storage regions having different properties in terms of processing speed and/or storage capacity, and to store the data in the storage region selected. However, when the system configuration is altered, such as when an old computer is replaced by a new computer, maintaining the system can be difficult due to such reasons as the system configuration of the new computer not being able to take over the software's control information.

Also in the conventional system described above, although a hierarchical storage control is implemented on a per-logical storage device basis, a technology for the storage device to recognize a data structure of data stored in the logical storage device or a technology for executing exclusive control are not disclosed. As a result, it would be difficult for a plurality of computers to share the same logical storage devices, and integrating storage devices used by a plurality of computers in order to reduce the management cost of the computer system would require imposing certain limitations on the configuration of the computer system, such as allocating a logical storage device for each computer.

The second problem is that optimal placement of data according to the life cycle or type of data is difficult.

According to the conventional technology, data that had high access frequency in the past is assumed to have high access frequency in the future as well, and the storage regions in which the data is stored are determined based on statistical information regarding data access frequency and on used capacity of storage regions that can be accessed at high-speed. The processing efficiency can be improved by increasing the probability with which data with high access frequency can reside in a storage device that can be accessed at high-speed. However, there are no technologies disclosed for determining storage regions in which to store data by taking into consideration differences in data properties that are dependent on the data's life cycle stage, i.e., the time elapsed since the corresponding file was generated, the type of application that generates and uses the data, and the type of data itself.

The third problem is that the effect of the hierarchical storage control is small.

Although the conventional system described above executes a hierarchical storage control by taking advantage of the difference in capacity and price between magnetic tapes and magnetic disks, the difference in capacity and price between magnetic tapes and magnetic disks have been growing smaller in recent years; consequently, the effect of cost optimization and cost reduction through the use of hierarchical storage control has also been growing smaller. Furthermore, due to the fact that the access speed to magnetic tapes is extremely slow compared to access speed to magnetic disks, it is difficult to use magnetic tapes as storage device for online access.

In the conventional system described above, a hierarchical storage control is executed by taking advantage of the difference in price and performance resulting from different RAID configurations of magnetic disks; however, since the price difference results only from the difference in the degree of redundancy in RAID configurations, the only cost reduction that can be hoped for is the cost reduction equivalent only to the difference in the degree of redundancy.

SUMMARY OF THE INVENTION

The present invention relates to a control method or a storage device that can execute a hierarchical storage control for file storage positions without being dependent on the OS or applications executed on a host computer.

The present invention also relates to a hierarchical storage control method for a plurality of computers to share files, or to provide a storage device that executes such a hierarchical storage control.

The present invention also relates to a control method or a storage device that can execute a hierarchical storage control according to file properties.

The present invention further relates to a hierarchical storage control method with high cost reduction effect, or to provide a storage device that executes such a hierarchical storage control.

In accordance with an embodiment of the present invention, a storage device comprises a plurality of storage regions having different properties, an interface control device that accepts from one or more computers access requests containing file identification information, and an interface control device for accessing storage regions that store data of the file designated by identification information, wherein the interface control device controls storage of file data in one of a plurality of storage regions according to the file property.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS:

FIG. 8 is a diagram of an example of a storage class management table.

FIG. 11 is a diagram of an example of a file property information management table.

FIG. 12 is a diagram of an example of a file storage management table.

PREFERRED EMBODIMENTS OF THE INVENTION

The following is a description of embodiments of the present invention. The following embodiments do not limit the present invention.

EMBODIMENT 1

Figure 1:
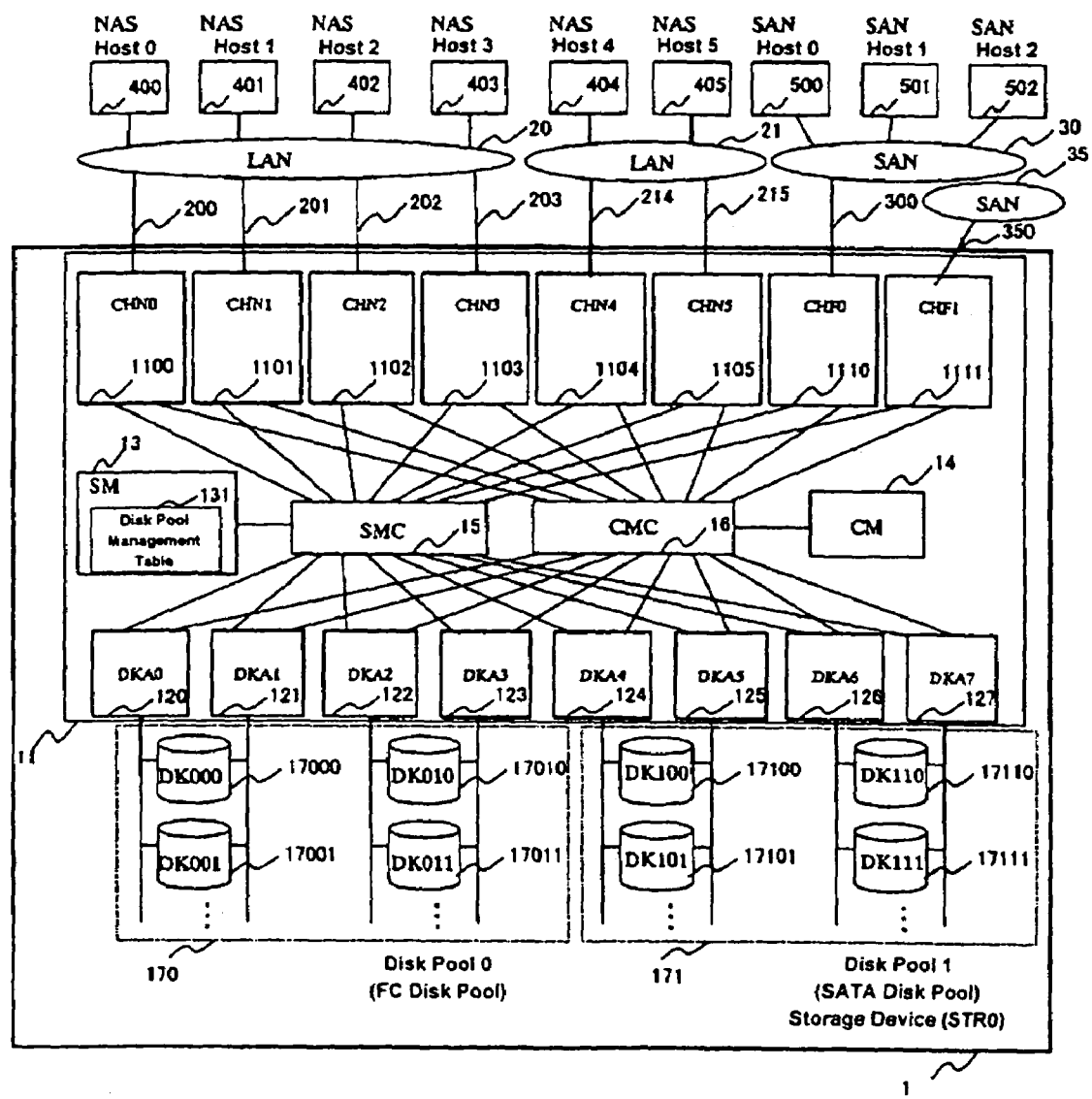
FIG. 1 is a diagram of an example of the configuration of a computer system in accordance with an embodiment of the present invention.

(1) Example of System Configuration (FIG. 1)

FIG. 1 is a diagram indicating an example of a computer system including a storage device 1 (it is also called a storage system), to which the present invention is applied. In the following, x may be any integer.

The storage device 1 is a disk array system comprising a disk controller (hereinafter called "DKC") 11 and a plurality of magnetic disk devices (hereinafter simply called "disks") 170$x$ and 171$x$. In the present embodiment, the storage device 1 is provided with two types of disks 170$x$ and 171$x$. 170$x$ are Fibre Channel (hereinafter called "FC") disks with FC-type interface, while 171$x$ are serial AT attached (hereinafter called "SATA") disks with serial ATA-type (SATA-type) interface. A plurality of FC disks 170$x$ makes up an FC disk pool 0 (170), while a plurality of SATA disks 171$x$ makes up a SATA disk pool 1 (171). The disk pools will be described in detail later.

Next, the configuration of the DKC 11 of the storage device 1 will be described. The DKC 11 comprises one or more NAS channel adapters 110$x$, one or more Fibre Channel adapters 111$x$, a plurality of disk adapters 12$x$, a shared memory 13 (hereinafter called "SM"), a shared memory controller 15 (hereinafter called "SMC"), a cache memory 14 (hereinafter called "CM"), and a cache memory controller 16 (hereinafter called "CMC").

The NAS channel adapters (hereinafter called "CHN") 110$x$ are interface control devices connected by file I/O interfaces to computers 40$x$ (hereinafter called "NAS hosts"), which are connected to a local area network (hereinafter called "LAN") 20 or a LAN 21.

The Fibre Channel adapters (hereinafter called "CHF") 111$x$ are interface control devices connected by block I/O interfaces to computers (hereinafter called "SAN hosts") 50$x$, which are connected to a storage area network (hereinafter called "SAN") 30. Hereinafter, CHN and CHF are collectively called channel adapters (hereinafter called "CH").

The disks 17$x$ are connected to the disk adapters 12$x$. Each disk adapter (hereinafter called "DKA") 12$x$ controls input and output to and from one or more disks 17$x$ connected to itself.

The SMC 15 is connected to the CHN 110$x$, the CHF111$x$, the DKA 12$x$ and the SM 13. The SMC 15 controls data transfer among the CHN 110$x$, the CHF111$x$, the DKA 12$x$ and the SM 13. The CMC 16 is connected to the CHN 110$x$, the CHF111$x$, the DKA 12$x$ and the CM 14. The CMC 16 controls data transfer among the CHN 110$x$, the CHFT111$x$, the DKA 12$x$ and the CM 14.

The SM 13 stores a disk pool management table 131. The disk pool management table 131 is information that is used to manage the configuration of the disk pools.

The LANs 20 and 21 connect the CHNs 110$x$ to the NAS hosts 40$x$. Generally, Ethernet® is used for LAN. The SAN 30 connects the CHFs 111$x$ to the SAN hosts 50$x$. Generally, Fibre Channel is used for SAN. However, an IP network can be used as the SAN, such that iSCSI, by which SCSI commands according to SCSI protocol are encapsulated into IP packets for sending and receiving, is used among equipment connected to the SAN. The SAN 35 according to the present embodiment is a dedicated SAN for connecting the storage device 1 and no SAN hosts are connected to the SAN 35.

In the storage device 1, all CHs can access the CM 14, the SM 13, any DKAs 12$x$ and any disks 17$x$, via the CMC 16 or the SMC 15.

The storage device 1 shown in FIG. 1 has both the SAN interfaces (CHFs 11$x$) for connecting to the SAN hosts 50$x$ and the NAS interfaces (CHNs 110$x$) for connecting to the NAS hosts 40x, but the present embodiment can be implemented even if the storage device 1 has only the NAS interfaces.

Figure 2:
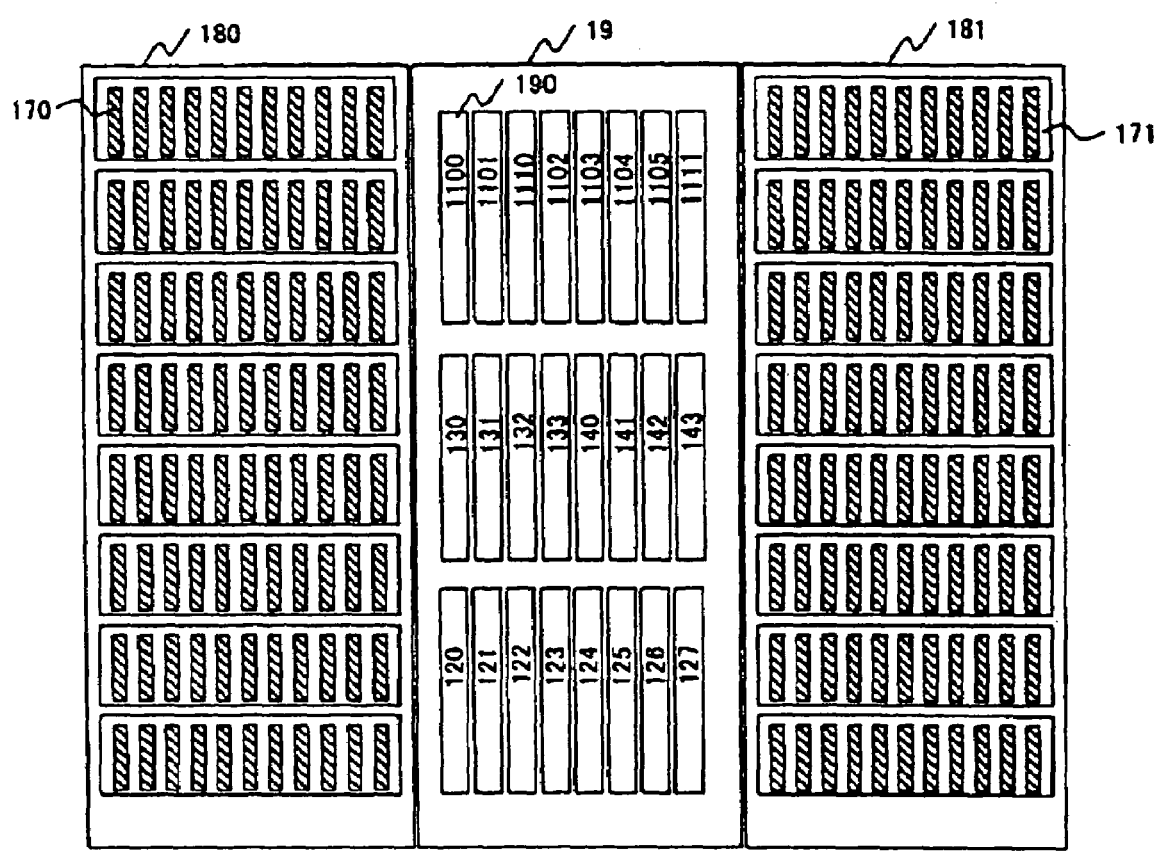
FIG. 2 is a diagram of an example of the exterior appearance of a storage device.

(2) Example of Exterior Appearance of Storage Device (FIG. 2)

FIG. 2 is a diagram of an example of the exterior appearance of the storage device 1.

A DKC unit 19 stores the CHNs 110x, the CHFs 111x, the DKAs 12x, the SM 13 and the CM 14, which are components of the DKC 11. The SM 13 actually comprises a plurality of controller boards 13x. The CM 14 also comprises a plurality of cache boards 14x. Users of the storage device 1 can increase or decrease the number of such boards in order to configure the storage device 1 with the CM 14 and the SM 13 having the desired storage capacity. Disk units (hereinafter called "DKU") 180 and DKUs 181 store the disk pool 170 and the disk pool 171, respectively.

Adapter boards built-in with the CHNs 110x, the CHFs 111x, the DKAs 12x, the controller boards 13x and the cache boards 14x are stored in slots 190. According to the present embodiment, the shape of the slots 190, the size of the adapter boards and the shape of connectors are made uniform regardless of the type of adapter boards or the type of interface, which maintains compatibility among various types of boards. As a result, in the DKC unit 19, any adapter board can be mounted into any slot 190 regardless of the type of the adapter board or the type of the interface. Furthermore, users of the storage device 1 can freely select the number of adapter boards for the CHNs 110x and the CHFs 111x in order to mount the number of the CHNs 110x and the CHFs 111x selected into the slots 190 of the DKC unit 19.

Figure 3:
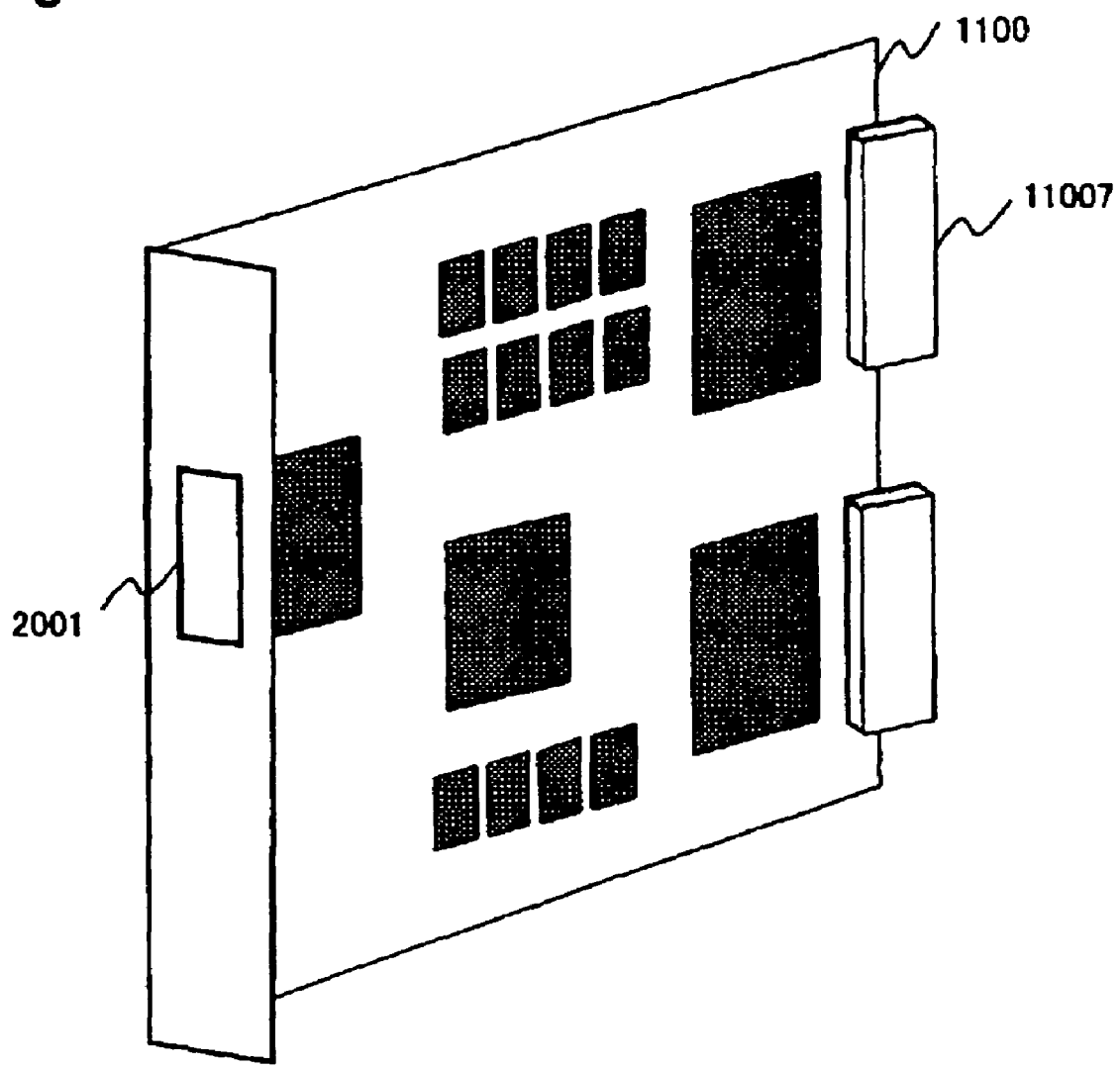
FIG. 3 is a diagram of an example of the exterior appearance of an adapter board.

(3) Example of Exterior Configuration of Adapter Board (Hereinafter Called "NAS Board") with the CHN 110X Built-In (FIG. 3)

FIG. 3 is a diagram of an example of the exterior configuration of a NAS board. A connector 11007 is connected to a connector of the DKC unit 19. An interface connector 2001 is Ethernet®-compatible and can be connected to Ethernet®.

According to the present embodiment, due to the fact that the shape of the connector on adapter boards is uniform regardless of the type of the adapter board as described earlier, the adapter boards with built-in CHNs 110x and the adapter boards with built-in CHFs 111x have connectors of the same shape. On the adapter boards with the built-in CHFs 111x, the interface connector 2001 is Fibre Channel-compatible and configured to be connected to Fibre Channel.

Figure 4:
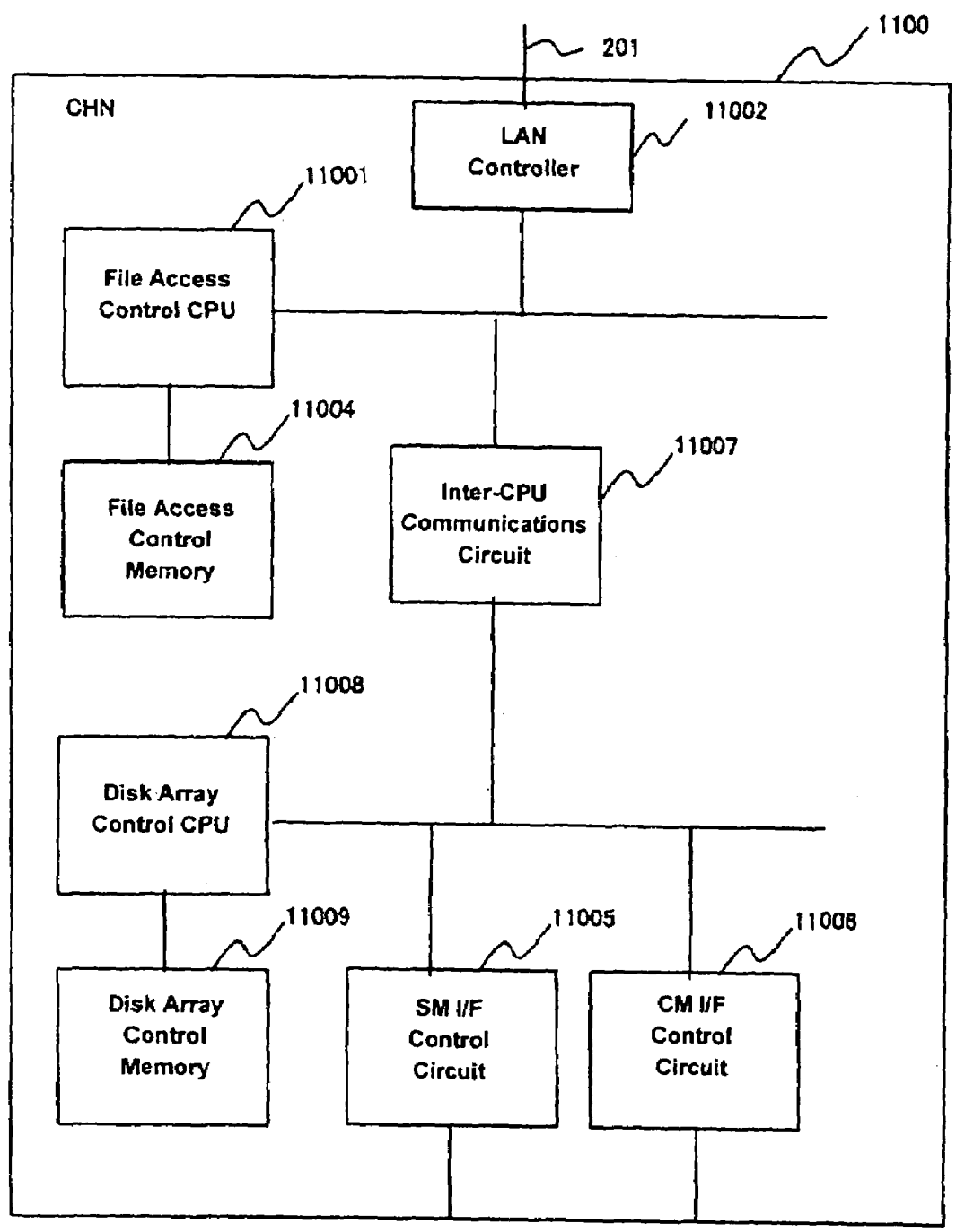
FIG. 4 is a diagram of an example of the configuration of a NAS channel adapter.

(4) Example of Configuration of NAS Board (or CHN) (FIG. 4)

FIG. 4 is a diagram of an example of the configuration of the CHN 110x. A file access control CPU 11001 is a processor for controlling file access. A LAN controller 11002 is connected to the LAN 20 via the interface connector 2001 and controls sending and receiving of data to and from the LAN 20. A file access control memory 11004 is connected to the file access control CPU 11001. The file access control memory 11004 stores programs executed by the file access control CPU 11001 and control data.

A disk array control CPU 11008 is a processor for controlling a disk array. The disk array refers to a storage device consisting of a plurality of disks. Disk arrays in which at least one of a plurality of disks stores redundant data to provide fault tolerance are called RAIDs. RAIDs are described later. A disk array control memory 11009 is connected to the disk array control CPU 11008 and stores programs executed by the disk array control CPU 11009 and control data. An SM I/F control circuit 11005 is a circuit for controlling access from the CHNs 110x to the SM 13. A CM I/F control circuit 11006 is a circuit for controlling access from the CHNs 110x to the CM 14. An inter-CPU communications circuit 11007 is a communications circuit used when the file access control CPU 11001 communicates with the disk array control CPU 11008 in order to access disks.

The present embodiment indicates an example of an asymmetrical multiprocessor configuration in which two processors, the file access control CPU 11001 and the disk array control CPU 11208, are mounted on each CHN 110x; however, each CHN 110x can be configured by mounting a single processor that executes both the file access control and the disk array control, or as a symmetrical multiprocessor configuration in which two or more processors are mounted as equivalents to execute the file access control and the disk array control. The configuration of each CHF111x is the configuration shown in FIG. 4, except that components shown in top half of FIG. 4, namely the LAN controller 11002, the file access control CPU 11001, the file access control memory 11004 and the inter-CPU communications circuit 11007, are replaced by a Fibre Channel controller.

Figure 5:
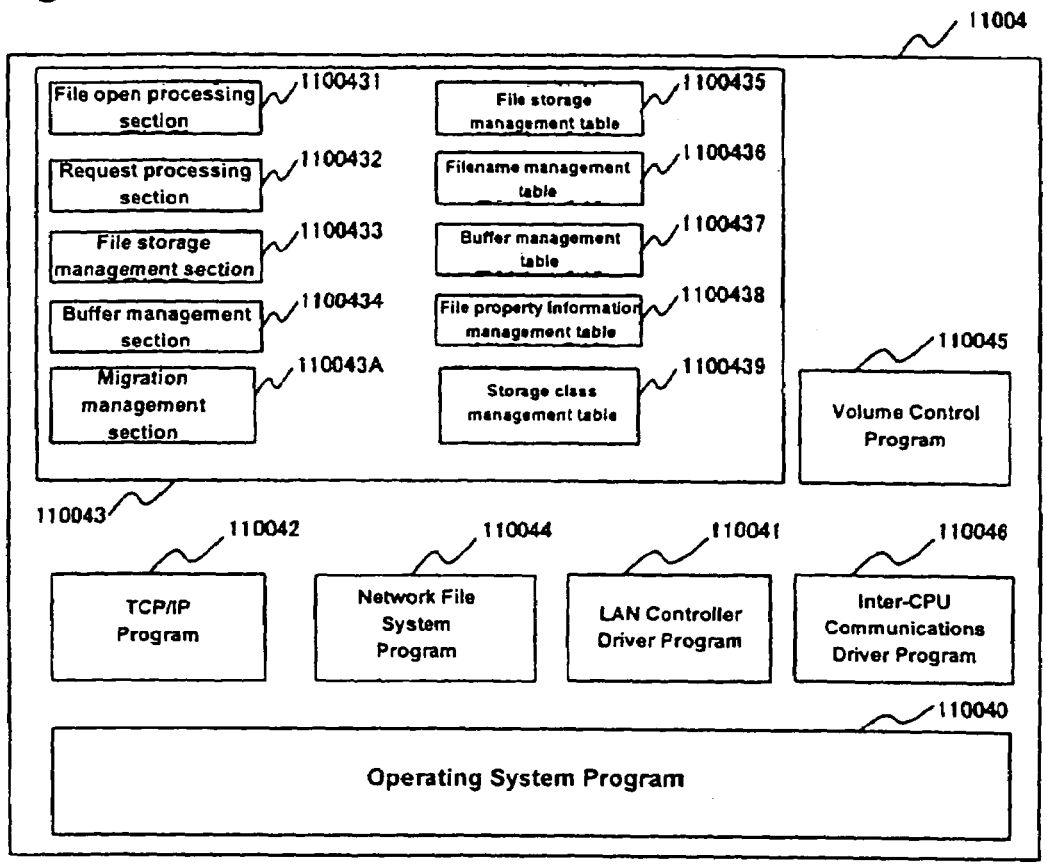
FIG. 5 is a diagram of an example of programs stored in a file system control memory.

(5) Example of Programs Stored in File Access Control Memory (FIG. 5)

FIG. 5 is a diagram of an example of programs and control data stored in the file access control memory 11004 of the CHN 110x. An operating system program 110040 is used for the management of programs as a whole and for input/output control. A LAN controller driver program 110041 is used for the control of the LAN controller 11002. A TCP/IP program 110042 is used for the control of TCP/IP, which is the communications protocol for LAN. A file system program 110043 is used for managing files stored in the storage device 1. A network file system program 110044 is used for controlling NFS and/or CIFS, which are protocols for providing files stored in the storage device 1 to the NAS hosts 40x. A volume control program 110045 is used for controlling the configuration of each logical volume by combining a plurality of logical disk units (hereinafter called "LU"), each of which is a unit of storage region set within the disk pools 17x. An inter-CPU communications driver program 110046 is used for controlling the inter-CPU communications circuit 11007, which is used for communication between the file access control CPU 11001 and the disk array control CPU 11008.

The file system program 110043 includes the following:
1) a file open processing section 1100431 for executing a file open processing when using a file;
2) a request processing section 1100432 for executing a processing according to a file access request when a file access request is received;
3) a file storage management section 1100433 for dividing each file into blocks, determining the storage position on a disk for each block, and managing the storage position of each block;
4) a buffer management section 1100434 for managing correlation between each block and a buffer formed in the memory;
5) a file storage management table 1100485 for managing addresses of storage regions on disks that store blocks that make up each file;

6) a filename management table 1100436 for managing filenames of open files and file handlers used to access the file storage management table 1100435 of each file;

7) a buffer management table 1100437 for managing buffer addresses indicating storage regions within buffers corresponding to blocks that make up a file;

8) a file property information management table 1100438 for storing file static properties, such as the file type, the application that generated the file, the intent of the file generator, and file dynamic properties, such as the value of the file that varies according to the file's life cycle stage and the file's access properties;

9) a migration management section 110043A used when executing a processing to migrate files between LUs; and 10) a storage class management table 1100439 that registers for each LU in the storage pool a storage class, described later, and identification information of the storage device in which an LU resides.

Figure 6:
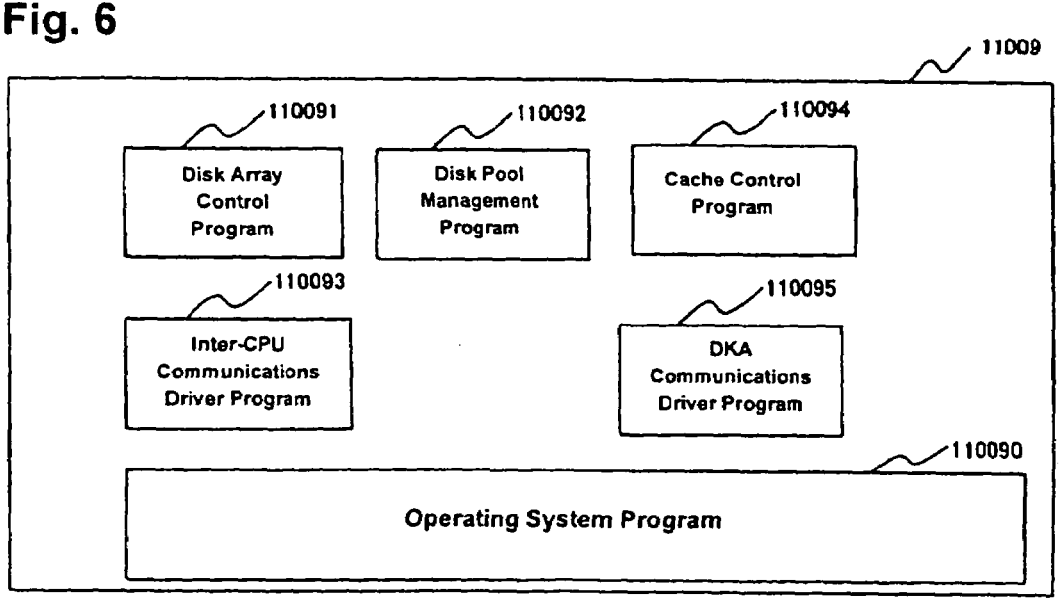
FIG. 6 is a diagram of an example of programs stored in a disk array control memory.

(6) Configuration of Disk Array Control Memory (FIG. 6)

FIG. 6 is a diagram of an example of programs stored in the disk array control memory 11009. An operating system program 110090 is used for managing programs as a whole and for controlling input/output. A disk array control program 110091 is used for constructing LUs within the disk pools 17x and for processing access requests from the file access control CPU 11001. A disk pool management program 110092 is used for managing the configuration of the disk pools 17x by using information in the disk pool management table 131 stored in the SM 13. An inter-CPU communications driver program 110093 is used for controlling the inter-CPU communications circuit 11007, which is used for communication between the file access control CPU 11001 and the disk array control CPU 11008. A cache control program 110094 is used for managing data stored in the CM 14 and for controlling cache hit/miss judgments. A DKA communications driver program 110095 is used when accessing an LU in order to communicate with the DKAs 12x, which control the disks 170x and 171x that make up the LU.

Figure 7:
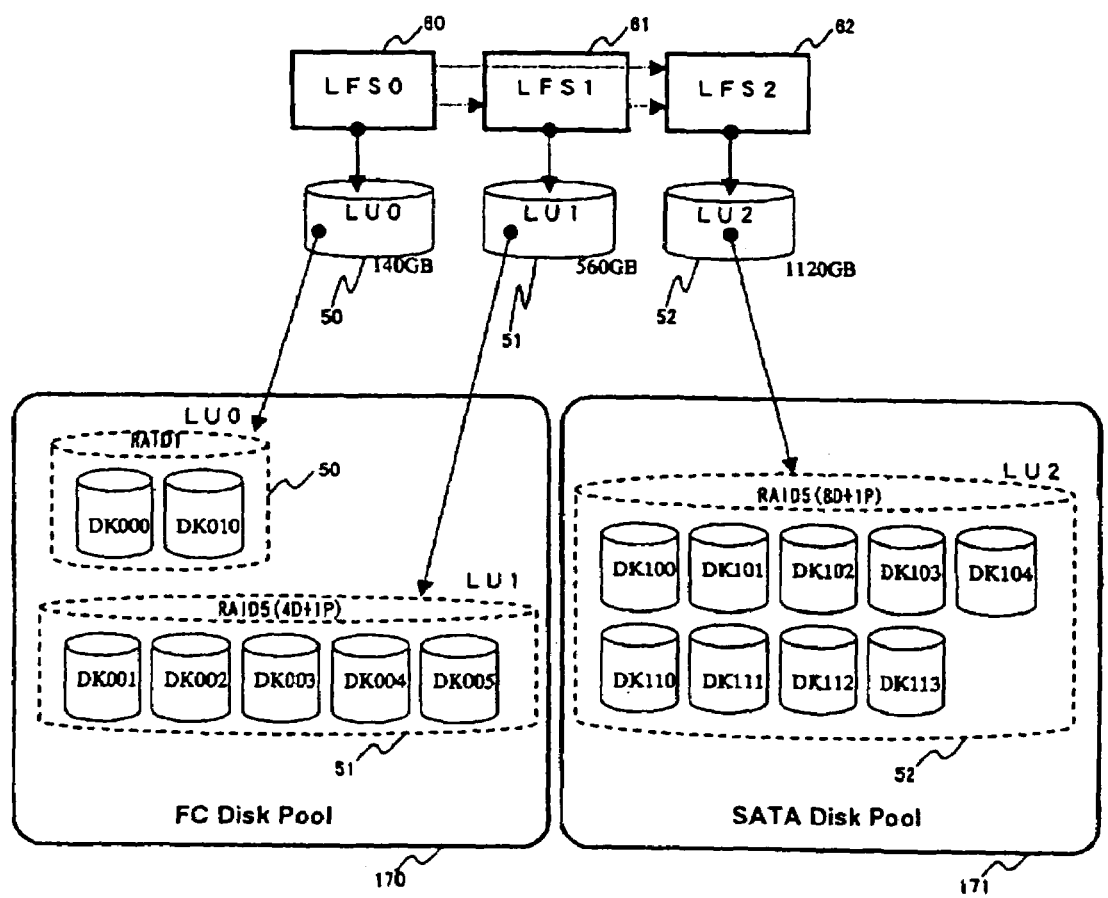
FIG. 7 is a diagram of an example of the relationship among disk pools, LUs and file systems.

(7) Configuration of Disk Pools (FIG. 7)

FIG. 7 is a diagram of an example of the configuration of the disk pools.

In the FC disk pool 170 are set two LUs, LU0 (50) and LU1 (51). The LU0 (50) comprises two PC disks, DK000 and DK100, where the DK000 and the DK100 make up RAID 1. The LU1 (51) consists of 5FC disks, DK001, DK002, DK003, DK004, and DK005, where the five PC disks make up a 4D+1P configuration RAID 5. The RAID 1 and the RAID 5 refer to data placement methods in a disk array and are discussed in detail in "A Case for Redundant Arrays of Inexpensive Disks (RAID)" by D. Patterson, et aL., ACM SIGMOD Conference Proceedings, 1988, pp. 109-116. In the LU0 with the RAID 1 configuration, the two FC disks DK000 and DK010 have a mirror relationship with each other. In the meantime, the LU1 having the RAID 5 configuration consists of one or more disks that store data stripes, which store data of files accessed from host computers, and one or more disks that store parity stripes, which are used to retrieve data stored in the data stripes. The LU1 has the 4D+1P configuration RAID 5, which indicates a RAID 5 consisting of four data stripes and one parity stripe. Similar representations will be used hereinafter to indicate the number of data stripes and the number of parity stripes in LUs having the RAID 5 configuration.

LU2 (52) is established in the SATA disk pool 171. The LU2 (52) consists of nine SATA disks, DK100, DK101, DK102, DK103, DK104, DK110, DK111, DK112 and DK113, where the nine SATA disks make up an 8D+1P configuration RAID 5.

When the capacity of each disk is 140 GB, the LU0 (50) has 140 GB, the LU1 (51) has 560 GB, and the LU2 (52) has 1120 GB in usable storage capacity.

Independent local file systems LFS0 (60), LFS1 (61) and LFS2 (62) are established and constructed for the LU0 (50), the LU1 (51) and the LU2 (52), respectively.

(8) Storage Class Management Table (FIG. 8)

FIG. 8 is an example of the configuration of a storage class management table 1100451 stored in the file access control memory 11004 of each CHN 110x. The storage class management table 1100451 is generated by the file access control CPU 11001's executing the file system program 110043 and referring to information stored in the disk pool management table 131 of the SM 13.

Although the disk pool management table 131 is not shown, the disk pool management table 131 is stored in the SM 13 and contains information similar to the information in the storage class management table 1100451 for all CHs. In other words, of the information in the disk pool management table 131, the storage class management table 1100451 stored in the file access control memory 11004 of each CHN 110x contains information regarding LUs used by the CHN 110x, but rearranged with the storage class as a key.

The following is a description of the configuration of the storage class management table 1100451. A storage class entry (1100451a) stores information indicating storage class. A storage node # entry (1100451b) stores an identification number (called a "storage node number") of the storage device that makes up each storage class. A disk pool 4 entry (110045 1c) stores a disk pool number that makes up each storage class. An LU # entry (1100451d) stores an LU number set for each disk pool. In an LU type entry (1100451e), information stored indicates whether the corresponding LU is set internally (local) or externally (remote) to the given storage device and whether a file system is set in the LU. In other words, if the LU is within the storage device, "Local" is registered in the LU type entry, while "Remote" is registered if the LU is in a different storage device; if a system is constructed in that LU, "File" is registered in the LU type entry, while "Block" is registered if no file systems are constructed in the LU. In a RAID Conf. entry (1100451f), information stored indicates the RAID level of the disk array that makes up each LU and the structure of the corresponding disk array, such as data record and parity record number within a parity group. In a usable capacity entry (1100451g) and a used capacity entry (1100451h), information that indicates the total storage capacity of the given LU and information that indicates the storage capacity being used, respectively, are stored.

A storage class is a hierarchical attribute provided for each storage region based on the usage of data storage; according to the present embodiment, three attributes of OnLine Storage, NearLine Storage and Archive Storage are defined. In addition, sub-attributes of Premium and Normal are defined for the OnLine Storage. The OnLine Storage is an attribute set for LUs suitable for storing data of files that are frequently accessed, such as files being accessed online and files being generated. Premium indicates an attribute set for LUs suitable for storing data especially requiring fast response. The NearLine Storage is an attribute set for LUs suitable for storing data of files that are not frequently used but are occasionally accessed. The Archive Storage is an attribute set for LUs suitable for storing data of files that are hardly ever accessed and are maintained for long-term storage.

FIG. 8 indicates that there are the LU0 (50) of the OnLine Storage (Premium) class and the LU1 (51) of the OnLine Storage (Normal) class in the FC disk pool 170 of the storage device 1 (called "STR0"). Further, in the SATA disk pool 171 of the storage device 1 (STR0) is the LU2 (52) of the NearLine Storage class. Moreover, in a different storage device (STR1) is an LU3 (53) of the Archive Storage class in a SATA disk pool. An example of constructing disk pools in different storage devices is described later.

Figure 9:
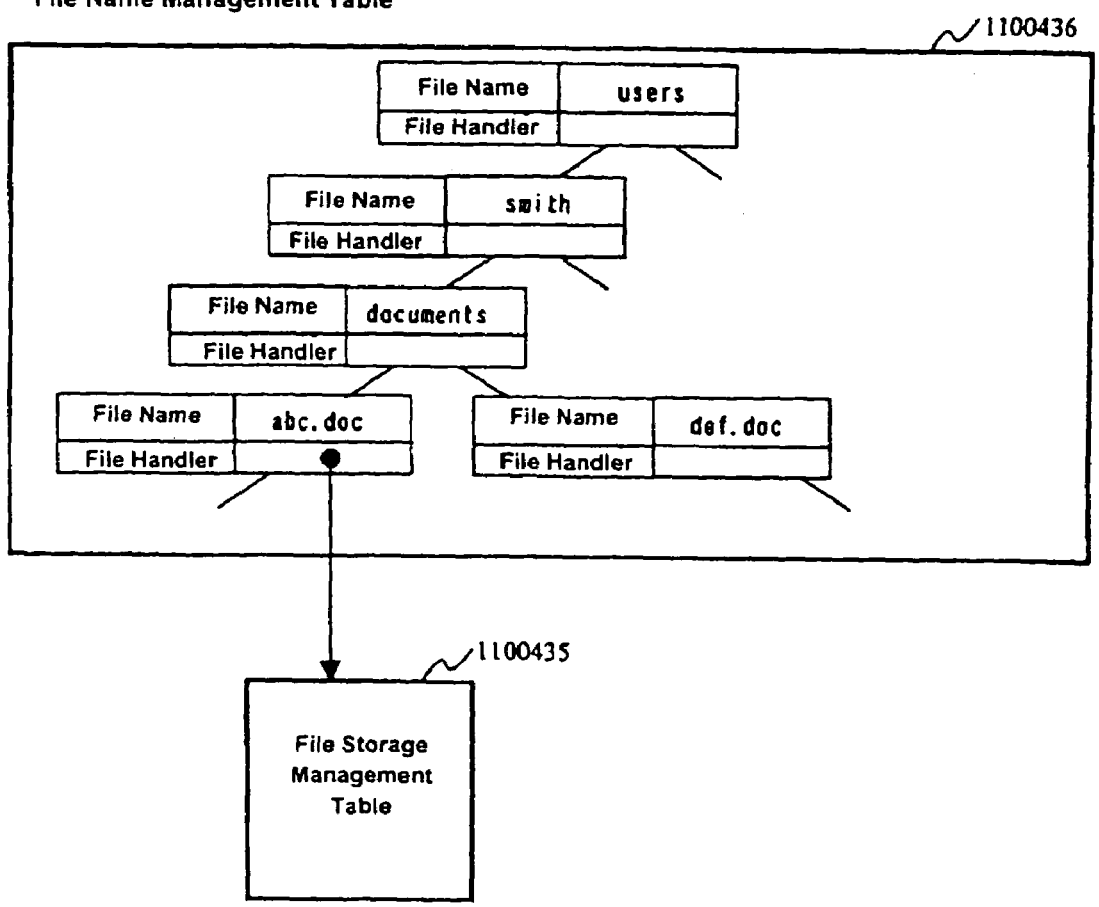
FIG. 9 is a diagram of an example of a filename management table.

(9) Filename Management Table (FIG. 9)

FIG. 9 shows an example of the filename management table 1100436 that is stored in the file access control memory 11004. The filename management table 1100436 is a table prepared for each file system, where filenames and file handlers are stored in a tree structure for easy searchability. When a file is accessed by one of the NAS hosts 40x, the filename of the file is included in an access request received by the CHN 110x from the NAS host 40x. The CHN 110x uses the filename to search the filename management table 11004 and obtains the file handler that corresponds to the filename, which enables the CHN 110x to refer to the file storage management table 1100435 that corresponds to the file handler.

Each filename management table 1100436 is stored in the LU in which the file system that corresponds to the filename management table 1100436 is constructed, and is read to the file access control memory 11004 when necessary and used by the file access control CPU 11001.

Figure 10:
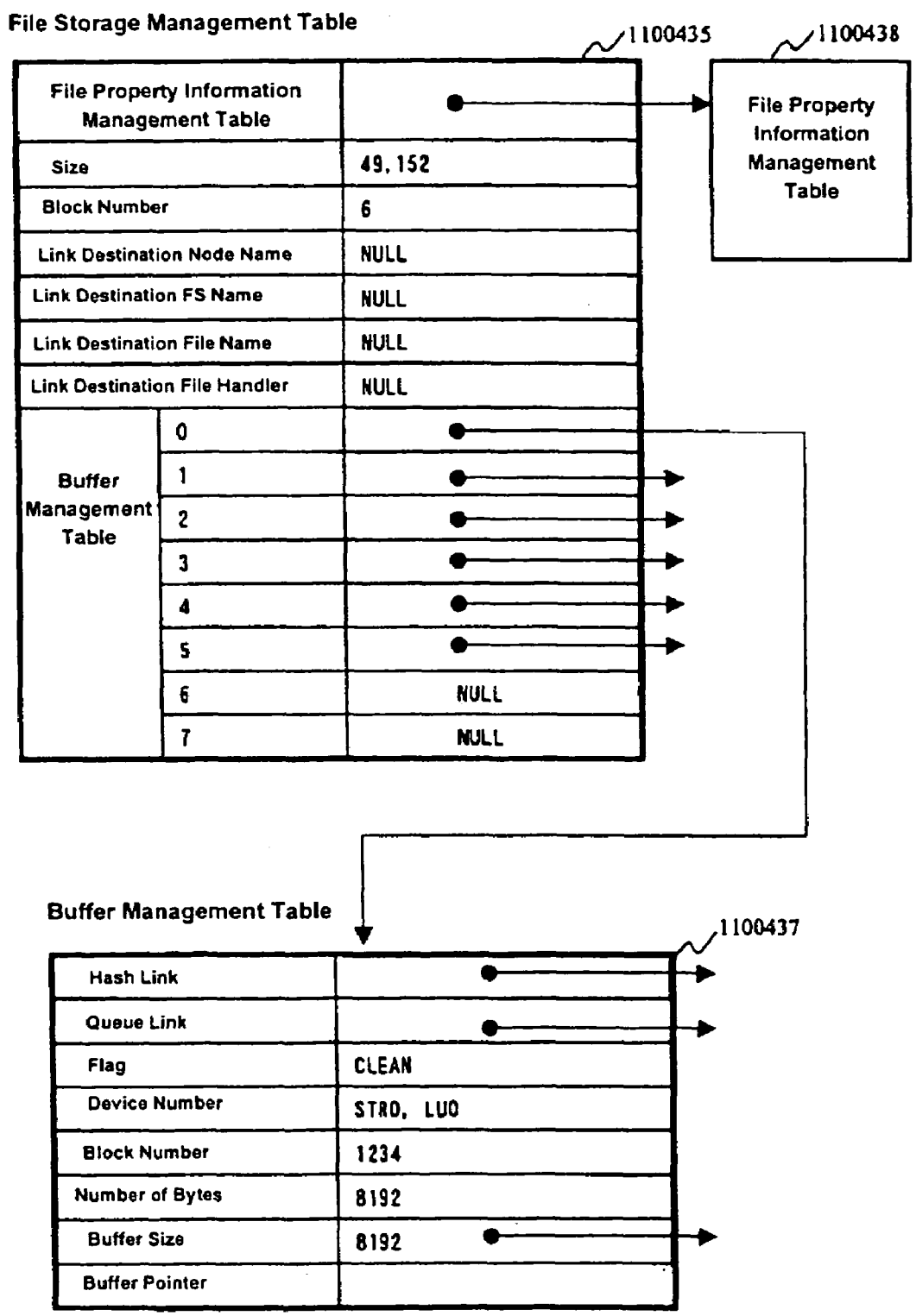
FIG. 10 is a diagram of an example of a file storage management table and a buffer management table.

(10) File Storage Management Table (FIG. 10)

FIG. 10 is a diagram of an example of the file storage management table 1100435 and the buffer management table 1100437. The file storage management table 1100435 is provided in the file access control memory 11004 for each file and is a table that manages file storage addresses. The file storage management table 1100435 can be referred to by designating a file handler that represents a file.

A file property information management table entry stores a pointer for referring to the file property information management table 1100438 for the corresponding file. A size indicates the size of the file in units of bytes. A number of blocks indicates the number of logical blocks used in managing the file, which is done by dividing the file into blocks called logical blocks. Each logical block that stores the file also stores a pointer to the buffer management table 1100437 that corresponds to the logical block.

There is one buffer management table 1100437 for each logical block, and each buffer management table 1100437 contains the following. A hash link entry stores a link pointer to a hash table for quickly determining whether a buffer is valid. A queue link entry stores a link pointer for forming a queue. A flag entry stores a flag that indicates the status of the corresponding buffer, i.e. whether valid data is stored in the buffer, whether the buffer is being used, whether the content of the buffer is unreflected on the disk. An equipment number entry stores an identifier of the storage device and an identifier of the LU in which the corresponding logical block is stored. A block number entry stores a disk address number that indicates the storage position of the logical block within the storage device indicated by the equipment number. A number of bytes entry stores the number of bytes of valid data stored in the logical block. A buffer size entry stores the size of the buffer in units of bytes. A buffer pointer entry stores a pointer to the corresponding physical buffer memory.

The file storage management table 1100435 is stored in the LU that stores the corresponding file and is read to the memory when necessary for use.

(11) File Property Information Management Table (FIG. 11)

FIG. 11 is an example of the file property information management table 1100438 stored in the file access control memory 11004. The file property information management table 1100438 stores static property information and dynamic property information. The static property information is determined when a file is configured and carries over thereafter. Although the static property information can be intentionally altered, it otherwise remains unaltered. The dynamic property information changes over time after a file is created.

(12) Static Property Information

The static property information is divided into a file information category and a policy category.

The file information category includes basic information of a file. In the file information category, a file type indicates the type of the file, such as a text file, document file, picture file, moving picture file or a voice file. An application indicates the application that generated the file. A date created indicates the date the file was first generated. The time at which the file was generated can be registered in addition to the date the file was created. An owner indicates the name of the user who created the file. An access identifier indicates a range of access authorization for the file.

The policy category is information that is set by the user or the application that created the file, and is information that is designated by the user or the application with regard to file storage conditions. An initial storage class is information that indicates the storage class of the LU in which the file is to be stored when the file is stored in a storage device for the first time. An asset value type indicates the asset value of the file. A life cycle model indicates the model applicable to the file from among life cycle models defined in advance. A migration plan indicates the plan applicable to the file from among plans concerning file migration (hereinafter called "migration") defined in advance.

The asset value is an attribute that designates the importance or value attached to the file. An attribute of "extra important," "important" or "regular," for example, can be designated as an asset value. The asset value can be used as a supplemental standard for selecting a storage class, i.e., files with an attribute of "important" or higher are stored in LUs that belong to the OnLine Storage class with Premium attribute, or as a standard for selecting a storage class when no life cycle models are designated, for example.

In the description of the present embodiment, it will be assumed that files that are "important" or higher are stored in LUs that belong to the OnLine Storage (Premium) class. Needless to say, the present invention is not restricted to such an assumption and different standards may be used to select storage classes of LUs for storing files.

The life cycle stages have been named by drawing analogy with life cycle stages of humans to describe how the usage status of a file changes over time, i.e., the period in which data is created is the birth, the period in which the data is updated and/or used is the growth stage, the period in which the data is rarely updated and is mainly referred to is the mature stage, and the period in which the data is no longer used and is archived is the old age. A life cycle model defines the life cycle a file experiences. The most general method of defining a life cycle is to define the stages based on the amount of time that has elapsed since a file was generated. One example is to define the "growth stage," or the "update stage," in which there are frequent updates, as one month; the "mature stage," or the "reference stage," in which the file is mainly referred to, as one year; and the "old age," or the "archive stage," as thereafter. Hereinafter this definition is called a "model 1", and is used in the following description. By varying the time interval of the life cycle model or by defining stages with finer resolution, various life cycle models can be defined and one life cycle model from among a plurality of life cycle models can be selected for use. Furthermore, a specific life cycle model can be applied to a certain type of files, or life cycle models can be applied on a per-application basis such that a specific life cycle model is applied to files created by a certain application. Names of the life cycle stages can be expressed in terms of "growth stage," "mature stage," and "old age" that correspond to the life of a person, or in terms of "update stage," "reference stage," and "archive stage" based on file behavior. In the present embodiment, the latter expressions are used in order to more clearly indicate the behavior of files.

The migration plan defines to which storage class LU a file is transferred according to the files life cycle stage. One example is a method for storing "update stage" files in OnLine Storage class LUs, "reference stage" files in the NearLine Storage class LUs, and "archive stage" files in Archive Storage class LUs. Hereinafter, this definition is called a "plan 1" and is used in the following description. In addition to this plan, various plans can be defined, such as a plan that defines "update stage" files to be stored in OnLine Storage (Premium) class LUs, and "reference stage" files in OnLine Storage (Normal) class LUs, while "archive stage" files remain in the NearLine Storage class LUs, and one plan from among a plurality of plans can be selected for use. Furthermore, a specific migration plan can be applied to a certain type of files, or migration plans can be applied on a per-application basis such that a migration plan is applied to files created by a certain application.

(13) Dynamic Property Information

The dynamic property information is divided into an access information category and a life cycle information category.

The access information category includes access statistical information for each file. In the access information category, a time stamp indicates the date and time a given file was last read or written, or the date and time the file storage management table 1100435 of the file was last updated. An access count indicates the total number of accesses to the file. A read count and a write count indicate the number of reads and the number of writes, respectively, to and from the file. A read size and a write size indicate the average value of the data transfer size when reading and writing, respectively, to and from the file. A read sequential count and a write sequential count indicate the number of times there is address continuity, i.e., sequentiality, between two of multiple consecutive accesses in reading or writing.

The life cycle information category includes information related to the life cycle of a file. In the life cycle information category, a current life cycle stage indicates the current positioning of a file within its life cycle, i.e., the update stage, the reference stage, or the archive stage. A current storage class indicates the storage class of a storage pool set for the LU that currently stores the file.

FIG. 11 indicates one example of the file property information, but various other types of property information can be defined and stored in the file property information management table 1100438. Furthermore, an embodiment may use only a part of the property information as necessary.

(14) Initial File Placement: A File Open processing

Next, a description will be made as to a file open processing that takes place in the initial placement processing to store a file in a storage device for the first time.

Let us assume that the NAS host 0 (400) generated a file abc.doc.

The NAS host 0 (400) issues to the CHN0 (1100) an open request for the file abc.doc. The open request includes a filename as identification information to identify the file. Since the open processing is executed to store the file for the first time, the NAS host 0 (400) sends to the CHN0 (1100) the following information included in the file information category and the policy category as the static property information of the file property information, along with the open request. The information sent includes a file type "document," an application that generated the file "XYZ Word," and an access identifier "-rw-rw-rw" as information included in the file information category, as well as an initial storage class "undesignated," an asset value type "important," the life cycle model "model 1," and the migration plan "plan 1" as information included in the policy category.

The CHN0 (1100) receives the open request from the NAS host 0 (400) via the LAN controller 11002, and the file access control CPU 11001 executes the file system program 110043.

When the file system program 110043 is executed, the open request received is specified through a control by the file access control CPU 11001 as an access request to access the local file system LFS0 (60) based on the directory information of the filename. The file open processing section 1100431 refers to the filename management table 1100436 of the LFS0 (60) and searches for abc.doc. Since it is determined as a result that abc.doc is a file that does not yet exist in the filename management table 1100436 and is to be stored for the first time, the file open processing section 1100431 registers abc.doc in the filename management table 1100436 and assigns a file handler to abc.doc.

Next, the file storage management section 1100433 creates the file storage management table 1100435 to correspond to the file handler assigned to the file abc.doc.

Next, the file storage management section 1100433 generates the file property information management table 1100438 and correlates it to the file storage management table 1100435 (i.e., a pointer to the file property information management table 1100438 is stored in the file storage management table 1100435); the file storage management section 1100433 then stores in the file property information management table 1100438 the static property information of the file property information for the file abc.doc obtained from the NAS host 0 (400), as well as the date created and owner of the file. Next, the file storage management table 1100435 and the file property information management table 1100438 are written to the LU in which is constructed the file system the file belongs to.

Next, the CHN0 (1100) returns the file handler to the NAS host 0 (400) and the open processing is terminated.

(15) Initial File Placement: A Data Write Processing

Next, a description will be made as to a data write processing executed in the initial placement processing of a file.

Using the file handler obtained in the open processing, the NAS host 0 (400) issues to the CHN0 (1100) a write request to store data of the file abc.doc in the storage device 1.

When the write request is received by the CHN0 (1100), the file access control CPU 11001 executes the file system program 110043 and uses a method similar to the method used in the open processing to specify that the write request is an access request to access the local file system LFS0 (60).

The request processing section 1100432 of the file system program 110043 interprets the access request as a write request based on the information included in the access request received, and uses the file handler designated in the write request to obtain the file storage management table 1100435 of the file that corresponds to the file handler.

Next, the file storage management section 1100433 secures buffers required to store the data and determines the storage positions on disks for the file.

To determine the storage positions, the file storage management section 100433 refers to the static property information in the file property information management table 1100438. In this case, due to the fact that the life cycle model of the file abc.doc, which is the subject of the write request, is "model 1," and to the fact that the write request received is an access taking place within one month of the file generation since it is an access request occurring in an initial file placement, the file storage management section 1100433 specifies the current life cycle stage of the file abc.doc as "growth stage." Further, since the initial storage class is "undesignated" and the asset value type is "important," the file storage management section 1100433 selects "OnLine Storage (Premium)" as the storage class of the storage pool in which to store the file abc.doc.

Next, the file storage management section 1100433 refers to the storage class management table 1100439 and decides to store the file abc.doc in an LU whose storage class is "OnLine Storage (Premium)" and that is specified by "STR0 (i.e., the primary storage device 1)" as the storage node, "FC disk pool 1700" as the disk pool #, and "LU0 (i.e., the local file system LFS0)" as the LU #. The file storage management section 1100433 divides the data of the file into one or more logical blocks based on an appropriate algorithm, determines storage addresses of the logical blocks in the LU0, generates buffer management tables 1100437 to register the storage addresses determined, and stores in the buffer management table entry of the file storage management table 1100435 pointers to the buffer management tables 1100437 generated. Furthermore, the file storage management section 1100433 stores information in the remaining entries of the file storage management table 1100435. In the present embodiment, NULL is registered for all entries for link destinations in the file storage management table 1100435.

The file storage management section 1100433 sets the current life cycle stage as "update stage" and the current storage class as "OnLine Storage (Premium)" in the life cycle information category of the dynamic property information of the file property information management table 1100438. The file storage management section 1100433 performs appropriate calculations for information included in the access information category of the dynamic property information before registering the results into the file property information management table 1100438.

The request processing section 1100432 executes a processing according to the write request received; and the LAN controller driver program 110041, the TCP/IP program 110042, and the network file system program 110044 are executed by the file access control CPU 11001; as a result, the write data is transferred from the NAS host 0 (400) to the CHN0 (1100) and temporarily stored in the buffer of the file access control memory 11004. Next, the inter-CPU communications driver program 110046 is executed by the file access control CPU 11001, and this causes the write request to be transferred to the disk array control CPU 11008 at proper timing. Upon receiving the write request, the disk array control CPU 11008 caches the write data temporarily in the CM 14 and sends a reply of completion with regard to the write request from the NAS host 0 (400).

Next, under the control of the DKA 120 that controls disks that make up the LU0, the write data is stored at proper timing on appropriate disks.

As described above, files can be initially placed in storage regions that belong to the appropriate storage class based on the static property information of the file.

(16) File Migration Processing (FIG. 12)

Next, a migration processing of a file will be described.

The migration management section 110043A of the file system program 110043 is activated by the file access control CPU 11001 based on a preset timing.

The migration management section 110043A refers to the file property information management table 1100438 of a file included in the local file system set in advance as the subject of the migration processing, and checks whether the file that is the subject of migration exists. The following is a detailed description of a situation in which the file abc.doc is the subject of the migration processing.

The migration management section 110043A refers to the file property information management table 1100438 of the file abc.doc and compares the date created to the current date and time. If one month has elapsed since the date created, the migration management section 110043A recognizes that the current life cycle stage has shifted from the "update stage" to the "reference stage" due to the fact that the life cycle model in the static property information indicates "model 1" and that one month, which is the period of the "update stage," has already passed.

Further, due to the fact that the migration plan is "plan 1," the migration management section 110043A recognizes that the file must be migrated from the LU whose storage class is the "OnLine Storage (Premium)" to an LU whose storage class is the "NearLine Storage."

The migration management section 110043A refers to the storage class management table 1100439 and decides to transfer the file to an LU whose storage class is the "NearLine Storage" and that is designated by "STR0 (i.e., the primary storage device 1)" as the storage node, "SATA disk pool 1710" as the disk pool #, and "LU2 (i.e., a local file system LFS2)" as the LU #.

Next, the migration management section 110043A changes the current life cycle stage to "reference stage" and the current storage class to "NearLine Storage" in the dynamic property information of the file property information management table 1100438.

The migration management section 110043A defines a unique filename (in this case FILE00001) that is used to manage the file abc.doc within the storage device STR0 (1).

The file open processing section 1100431 refers to the filename management table 1100436 of the LFS2 (60) and checks whether the filename FILE00001 is registered in the filename management table 1100436; if it is not registered, the file open processing section 1100431 registers the filename FILE00001 in the filename management table 1100436 and assigns a file handler to the filename FILE00001.

Next, the file storage management section 1100433 generates the file storage management table 1100435 and the file property information management table 1100438 to correspond to the file handler assigned to the filename FILE00001. Contents identical to the contents registered in the file property information management table of the file abc.doc are stored in the file property information management table 1100438 generated. The file storage management section 1100433 writes in the LU, which stores FILE00001, the file storage management table 1100435 and the file property information management table 110438 of FILE00001.

Next, the file storage management section 1100433 secures buffer regions required to store the data of FILE00001 and determines the storage regions (or the storage positions) within the LU2 for storing the file. Using a method similar to the method used in the data write processing, the file storage management section 1100433 generates the buffer management tables 1100437 to register the storage positions determined, and stores in the buffer management table entry of the file storage management table 1100435 pointers to the buffer management tables 1100437 generated. NULL is registered for all entries for link destinations in the file storage management table 1100435 of the FILE00001 stored in the LFS2.

As indicated in FIG. 12, the file storage management section 1100433 changes the link destination node name to STR0, the link destination FS name to LFS2, and the link destination filename to FILE00001 in the file storage management table 1100435 of abc.doc in the LFS0.

Next, the request processing section 1100432 reads data of the abc.doc from disks that make up the LU0 to buffers in the file access control memory 11004. The file storage management section 1100433 determines the data read to the buffers in the file access control memory 11004 as data of the FILE00001 to be written to the disks that make up the LU2, and the request processing section 1100432 writes the data to storage regions in the buffers registered in the buffer management tables 1100437.

The file storage management section 1100433 clears all buffer management tables 1100437 that can be referred to from pointers registered in the file storage management table 1100435 of the file abc.doc in the LFS0, and registers NULL in entries of these buffer management tables 1100437.

The data of the FILE00001 stored in the buffers is stored at proper timing in the LU2 via the CM 14 of the storage device 1 through a procedure similar to the procedure that took place in the data write processing of the initial placement processing. This completes the migration processing.

As described above, according to the present embodiment, files can be migrated to storage regions of an appropriate storage class by taking into consideration the life cycle stage of the file based on the migration plan of the file.

According to the present embodiment, LUs for storing files can be selected based on a concept of storage classes, and LUs for storing files can be changed, without being dependent on host computers or applications executed on the host computers. As a result, a storage device with storage hierarchy, i.e., a plurality of storage regions with varying properties, having high cost effectiveness can be realized without being dependent on host computers.

Further, due to the fact that data is migrated on a per-file basis, same files can be accessed from a plurality of host computers using a file I/O interface, even after the files are migrated.

Moreover, a file-based hierarchy storage control can be executed based on static properties of the file, such as the file type, the type of application that generated the file, the intent (policy) of the file generator, and on dynamic properties of the file, such as changes in the life cycle stage, value and access property of the file.

EMBODIMENT 2

Figure 13:
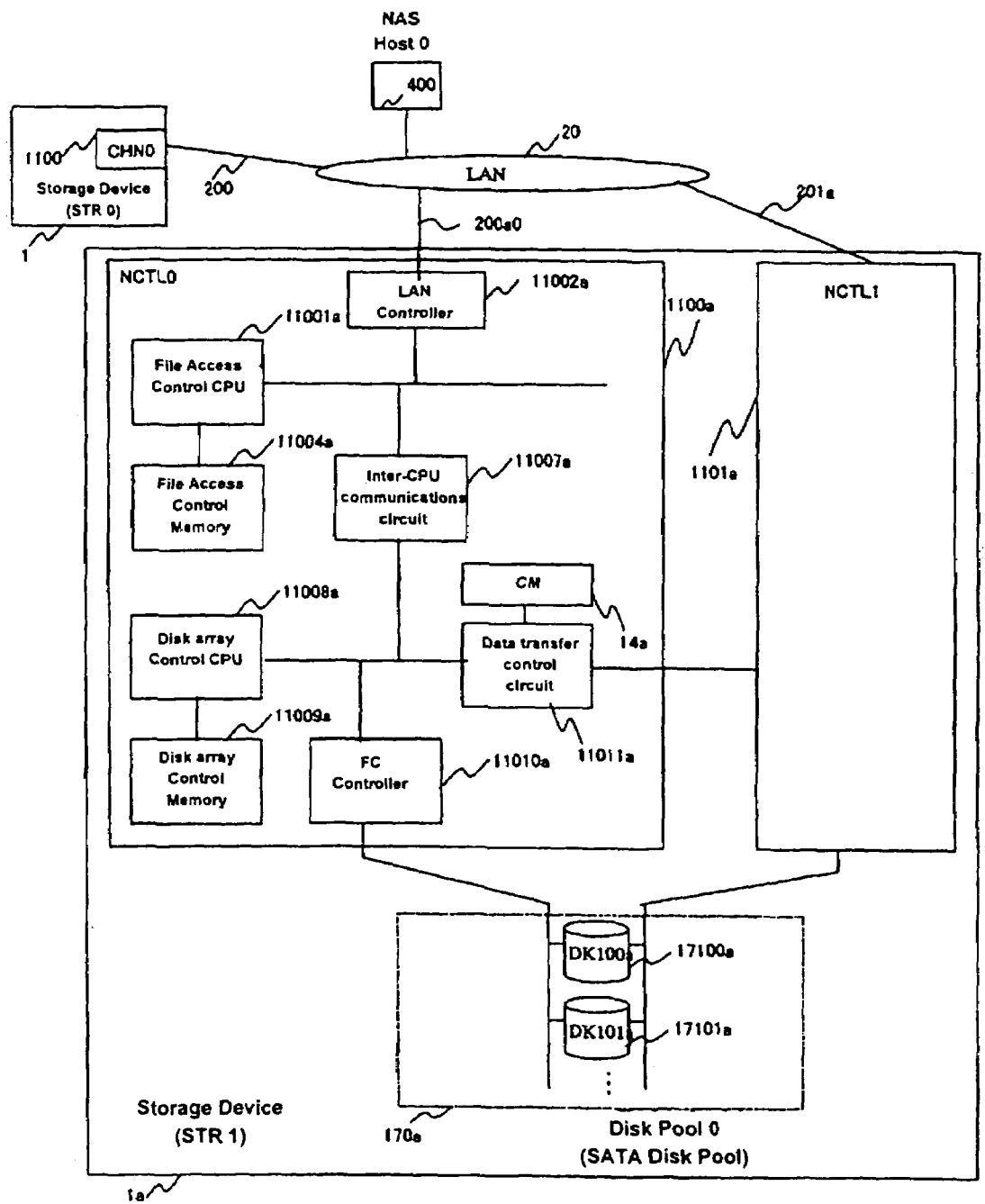
FIG. 13 is a diagram of an example of the second configuration of a system in accordance with another embodiment of the present invention.

(1) Example of System Configuration (FIG. 13)

Next, referring to FIG. 13, an example of the system configuration of the second embodiment will be described. In the present embodiment, a hierarchical storage control is executed between storage devices in a system in which a storage device 1 (hereinafter called "STR0") described in the first embodiment and another storage device 1a (hereinafter called "STR1") are connected via a network.

In FIG. 13, the storage device STR1(1a) is the other storage device connected to the storage device STR0 (1) via a LAN 20; otherwise, the system configuration components are the same as in FIG. 1.

In the STR1 (1a), an NCTL0 (1100a) and an NCTL1 (1101a) are NAS controllers, and a disk pool 0 (170a) is a disk pool connected to the NCTL0 and NCTL1.

Instead of the SM I/F control circuit 11005 and the CM I/F control circuit 11006 in the configuration of the CHN 1100 according to the first embodiment shown in FIG. 4, the NAS controller NCTLx is provided with an FC controller 11010a for connecting with the disk pool 0 1700a. The NAS controller NCTLx also has a cache memory CM 14a within the NAS controller, as well as a data transfer control circuit 11011a, which is a control circuit for the cache memory CM 14a. Further, the data transfer control circuit 11011a serves to connect the NAS controller 1100a and the NAS controller 1101a to each other. Although details of the configuration of the NAS controller NCTL1 (1101a) are not shown in FIG. 13, the NAS controller 1101a has a configuration similar to that of the NAS controller 1100a. Components that are assigned the same numbers as components of the CHN 1100 in the first embodiment have the same configuration and the same function as the corresponding components of the CHN 1100.

Let us assume that the STR1 is a storage device that is smaller and cheaper than the STR0. Also, as shown in FIG. 13, a CHN0 of the STR and the NCTL0 of the STR1 are connected via the LAN 20.

(2) Migration Processing of File to the Other Storage Device

The following is a description of the operation according to the present embodiment.

The CHN0 (1100) of the storage device 1 (STR0) recognizes that the storage device 1a (STR1) of a different type is connected to the LAN 20. The different storage device can be recognized using a method based on information designated in advance by an administrator or a method based on whether or not there is a device that reacts to a broadcast of a command for recognition to network segments of the LAN 20. In order to ascertain the configuration of the STR1, the CHN0 of the STR0 becomes an initiator and issues to the STR1 a command to collect information. The response from the STR1 to the command includes the type of the disk pool and the configuration of LUs that the STR1 has; as a result, by referring to the response, the CHN0 can recognize that the STR1 has the SATA disk pool 170a and that there is a low-cost file type LU having a 15D+1P configuration RAID 5 and with a large capacity of 2100 GB in the disk pool 170a. The CHN0 of the STR0 decides to manage the STR1's LU as a remote LU, i.e., as an LU that is in the other storage device STR1 (1a) but as one of the LUs that are managed by the primary storage device STR0 (1).

The CHN0 assigns a number LU3 to the LU that the STR1 has and assigns a remote file system number RFS3 to the file system constructed within the LU. Due to the fact that the LU is in a large capacity, low-cost disk pool, the storage class of the LU is set as "Archive Storage." Based on a control by a disk array control CPU 11008 of the CHN0, information regarding the LU3 in the STR1, such as the type of the disk pool, the configuration of the LU, the LU number and the storage class, is stored in a disk pool management table 131 of an SM 13 of the storage device 1 (STR0). The CHN of the storage device 1 refers to the disk pool management table 131 by having a file access control CPU 11001 execute a file system program 110043, and can register information regarding the LU3 in a storage class management table 1100451 in a file access control memory 11004 by copying the information regarding the LU3 from the disk pool management table 131.

As described in the first embodiment, let us assume that the NAS host 0 (400) stored the file abc.doc in the LU0 of the STR0 via the CHN0 and that subsequently the file abc.doc was migrated to the LU2 of the STR0 based on a control by the CHN0; in the following, only those parts that differ from the first embodiment in the processing executed to migrate the file abc.doc further to the LU3 in the other storage device STR1 are described.

As described in the first embodiment, the file abc.doc's current life cycle stage is "reference stage," its current storage class is "NearLine Storage," and its data section is stored under the name FILE00001 in the LFS2 of the LU2 constructed in the SATA disk pool of the STR0, as shown in FIGS. 11 and 12. The filename management table 1100436 in which the filename "abc.doc" is registered and the file storage management table 1100435 for the file abc.doc are in the LFS0. In other words, information regarding the abc.doc is stored in the filename management table 1100436 for the LFS0 and in the file storage management table 1100435 for the file abc.doc in the LFS0. In the meantime, the file property information management table 1100438 is in both the LFS0 and the LFS2. The data section of the file abc.doc has already been migrated to the LU2 in which is constructed the LFS2, which means that the data section of the abc.doc does not reside in the LU0, in which is constructed the LFS0.

The migration management section 11004SA of the STR0 refers to the file property information management table 1100438 of the abc.doc and compares the date created to the current date and time. If one year has elapsed since the migration, the migration management section 110043A recognizes that the current life cycle stage has shifted from the "reference stage" to the "archive stage" due to the fact that the life cycle model in the static property information for abc.doc indicates "model 1" and that one year, which is the period of the "reference stage," has already passed. Further, due to the fact that the migration plan is "plan 1" the migration management section 110043A recognizes that the file must be migrated from an LU whose storage class is "NearLine Storage" to an LU whose storage class is "Archive Storage".

Next, the migration management section 110043A refers to the storage class management table 1100439, selects the LU3 that belongs to the "Archive Storage" class, and decides to transfer the file abc.doc to the LU3. The LU3 has attributes of "STR1 (i.e., the other storage device 1a)" as the storage node, "SATA disk pool" as the disk pool #, and "remote file" as the LU type.

Next, the migration management section 110043A changes the current life cycle stage to "archive stage" and the current storage class to "Archive Storage" in the dynamic property information of the file property information management table 1100438 for the abc.doc.

Next, the migration management section 110043A defines a unique filename (in this case STR1-FILE00001) that is used to manage the file abc.doc within the storage device STR0 (1).

The migration management section 110043A behaves as it were a NAS host and issues to the STR1 an open request for the file STR1-FILE00001. This open processing is an open processing executed in order to store the file for the first time from the perspective of the STR1. For this reason, the STR0 includes in the open request sent to the STR1 the information that the STR0 has in the file property information management table 1100438 as the static property information of the file abc.doc. However, by changing only the initial storage class in the static property information to "Archive Storage" in the information sent, the STR0 expressly designates to the STR1 to store the file STR1-FILE00001 in the Archive Storage class from the beginning.

The NCTL0 of the STR1 receives the open request via a LAN controller 11002a, and a file access control CPU 11001a executes a file system program 110043a.

When the file system program 110043a is executed, the open request received is specified in a manner similar to the first embodiment as an access request to access the remote file system RFS3 the STR1-FILE00001 is registered in a filename management table 1100436a in a file access control memory 11004a and a file handler is assigned to the STR1-FILE00001 based on a control by the file access control CPU 11001a; a file storage management table 1100435a and a file property information management table 1100438a are created within the file access control memory 11004a and information to be registered in the tables is set. The NCTL0 sends to the migration management section 110043A of the CHN0 the file handler assigned to the STR1-FILE00001, and the open processing is terminated.

Next, like the NAS host 0 (400) in the data write processing according to the first embodiment, the migration management section 110043A of the STR0 issues to the STR1a write request containing the file handler obtained from the NCTL0 of the STR1 in the open processing, and requests to write actual data of abc.doc (i.e., data that is also actual data of FILE00001) as actual data of the file STR1-FILE00001.

The file storage management section 1100433a of the STR1 secures buffer regions required to store the write data, determines storage positions on disks of the actual data of the file, and stores the write data received from the STR0 in the buffers.

To determine the storage positions, the file storage management section 1100433a refers to the static property information in the file property information management table 1100438a. The file storage management section 1100433a specifies the current life cycle stage of the file STR1-FILE00001 as "archive stage" due to the fact that the life cycle model of the file STR1-FILE00001 is "model 1" and to the fact that more than one year and one month have passed since the file was generated. Further, the file storage management section 1100433a specifies "Archive Storage" as the initial storage class as designated by the STR0.

The file storage management section 1100433a sets the current life cycle stage as "archive stage" and the current storage class as "Archive Storage" in the life cycle information category of the dynamic property information of the file property information management table 1100438a. The file storage management section 1100433a further performs appropriate calculations for access information regarding the file STR1 FILE00001 and updates the information in the access information category of the file property information management table 1100438*a*. NULL is registered for all entries for link destinations in the file storage management table 1100435*a* of the file STR1-FILE00001.

Next, under the control of the NCTL0, the data section of the file STR1-FILE00001 is stored at proper timing on disks that make up the LU3.

This concludes the write processing in the STR1 and the processing returns to STR0.

The file storage management section 1100433 of the STR0 changes the link destination node name to STR1, the link destination FS name to LFS3, and the link destination filename to STR1-FILE00001 in the file storage management table 1100435 of the FILE00001 in the LFS2. The file storage management section 1100433 then clears all buffer management tables 1100437 that can be referred to from pointers registered in the file storage management table 1100435 of the FILE00001 and enters NULL in all buffer management table entries of the file storage management table 1100435.

The preceding transfers the substance of the data section of the file abc.doc from the FILE00001 in the LFS2 of the STR0 to STR1-FILE00001 in the RFS3 of the STR1.

After this, whenever an access request is issued by any of the NAS hosts to access the file abc.doc, the CHN of the STR0 refers to the file storage management table 1100435 of the abc.doc in the LFS0 and obtains its link destination node name, FS name and filename, and refers to the file storage management table 1100435 of the FILE00001 in the LFS2 based on the identification information of the link destination obtained (i.e., STR0, LFS2, FILE00001). The CHN of the STR0 further obtains the link destination node name, the FS name and the filename from the file storage management table 1100435 of the FILE00001 in the LFS2 and issues to the NCTL of the STR1 an access request designating identification information of the link destination obtained (i.e., STR1, LFS3, STR1-FILE00001), which allows the CHN of the STR0 to reach STR1-FILE00001 in the RFS3 of the STR1 and access the data section of the abc.doc via the NCTL of the STR1.

Due to the fact that a plurality of file storage management tables 1100435 must be referred to in order to access a file that has been migrated to the LUS of the STR1 according to the present embodiment, the access speed does suffer slightly. However, since files that are stored in the LU3 of the STR1 are files whose current life cycle stage is "archive stage" and therefore files that are rarely subjects of access requests, this poses no problem in practical terms. Even if an access request were to be issued from a host computer for data of a file in "archive stage," the data can be retrieved in real-time from its storage positions on disks since it is stored on magnetic disks, even though it is a file that belongs to the Archive Storage class; unlike conventional situations in which such files are stored on tapes, neither enormous access time for tape control nor transferring the data from the tape to a disk is required according to the present embodiment.

As described above, according to the present embodiment, due to the fact that the storage positions of a file are determined based on the life cycle stage of the file, the Archive Storage class suitable for archiving is selected for files in "archive stage," or the old age, in its life cycle.

Furthermore, other storage devices can be connected to the primary storage device, so that a storage hierarchy that takes advantage of differences in features of various storage devices can be constructed. Files can be migrated to LUs of the other storage devices, instead of migrating only within the primary storage device, according to the migration plan of each file; this further optimizes cost for storage devices compared to situations in which a hierarchical storage control is realized using only one storage device.

In addition, drives on disk devices that make up LUs whose storage class is "Archive Storage" can be halted to realize low power consumption and to extend the life of the disks.

Moreover, due to the fact that even cheaper storage devices can be connected to the storage device STR1 according to the present embodiment, a storage hierarchy that is even more extensive can be established among a plurality of storage devices; by executing a hierarchical storage control using such a configuration, cost can be further optimized.

EMBODIMENT 3

Figure 14:
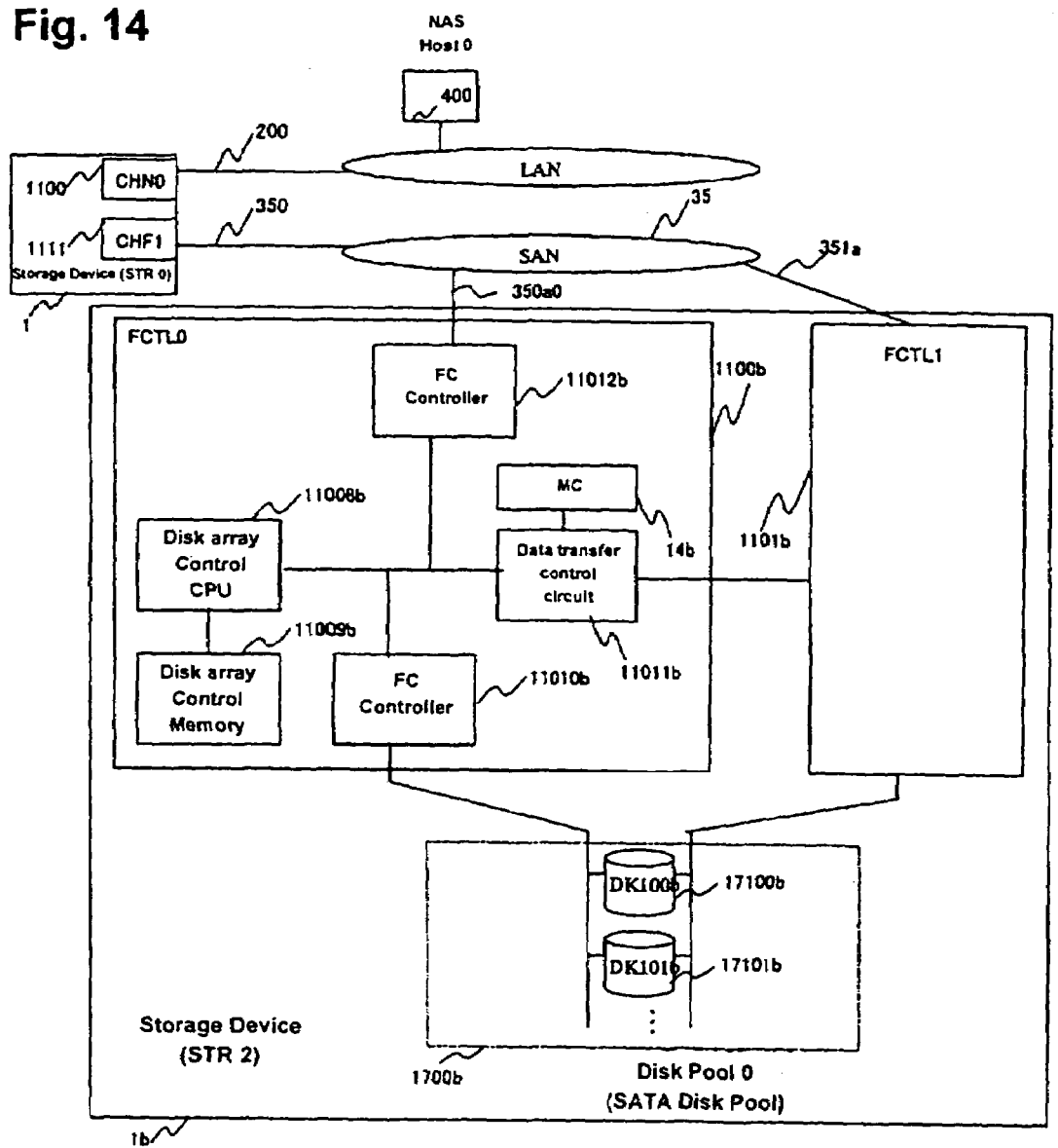
FIG. 14 is a diagram of an example of the third configuration of the system in accordance with another embodiment the present invention.

(1) Example of System Configuration (FIG. 14)

Next, with reference to FIG. 14, an example of the system configuration according to the third embodiment will be described. In the present embodiment, as in the second embodiment, a hierarchical storage control is executed among storage devices in a system in which another storage device STR2 (1*b*) is connected to a storage device STR0 (1) via a network. The third embodiment differs from the second embodiment in that while the network that connects the storage devices was the LAN 20 and file I/O interfaces were used between storage devices in the second embodiment, the network that connects the storage devices is a SAN 35, which is a dedicated network for connection between the storage devices, and a block I/O interface is used between storage devices in the third embodiment.

In FIG. 14, the storage device STR2 (1*b*) is a storage device with a small-scale configuration similar to the storage device STR1 (1*a*) in the second embodiment, but instead of the NAS controller NCTL0 of the storage device STR1 (1*a*) in the second embodiment, the storage device STR2 (1*b*) has SAN controllers FCTLx. Each FCTLx is provided with an FC controller 11012*b* to connect with the SAN 35, but it does not have the file access control CPU 11001*a* or its peripheral circuits as the STR1 does and does not perform file control. Otherwise, the storage device STR2 (1*b*) according to the present embodiment has a configuration similar to that of the storage device STR1 (1*a*) according to the second embodiment.

The SAN 35 is a dedicated network for connecting the storage device STR0 (1) to the storage device STR2 (1*b*), and SAN hosts are not connected to the SAN 35. For the sake of simplification, let us assume that in the present embodiment no SAN hosts are connected to the SAN 35, which is the network to connect the storage devices, and that there is only one network that connects the storage devices. However, SAN hosts can be connected to the SAN 35 and a plurality of networks for connecting the storage devices can be provided to improve fault tolerance.

In the present embodiment, the storage device STR2 (1*b*) is under the control of the storage device STR0 (1), and file accesses from a NAS host 0 (400) reaches the storage device STR2 (1*b*) via the storage device STR0 (1). Such a configuration is hereinafter called a "connection of diverse storage devices."

(2) Migration Processing of File to the Other Storage Device

Next, a description will be made as to the processing for migrating a file stored in the STR0 to the STR2, with emphasis on the difference between this processing and the processing according to the second embodiment.

A CHF1 (1111) of the storage device STR0 (1) recognizes that the storage device STR2 (1b), which is a divergent storage device, is connected to the SAN 35. The CHF1 (1111) acts as an initiator and issues a command to collect information and thereby recognizes that the STR2 (1b) is connected to the SAN 35. The CHF1 (1111) treats storage regions of the STR2 as if they were a disk pool within the primary storage device according to the first embodiment. A CHNC (1110) can use the disk pool via the CHF1 (1111). The management method of the disk pool is described later. In order to ascertain the configuration of the STR2, the CHN0 (1100) of the STR0 (1) becomes an initiator and issues a command to collect information via the CHF1 (1111) to the STR2. The CHN0 (1100) of the STR0 (1) receives a response from the STR2 to the command via the CHF1 (1111) and recognizes from the information included in the response that the STR2 has a SATA disk pool and a low-cost, block type LU having a 15D–F 1P configuration RAID 5 and with a large capacity of 2100 GB; based on this, the CHN0 (1100) of the STR0 decides to manage the LU as a remote LU. Furthermore, due to the fact that the disk pool that the STR2 has is a large capacity, low-cost disk pool, the CHN0 (1100) of the STR0 determines the storage class of the disk pool as "Archive Storage." The CHN0 (1100) of the STR0 assigns the number LU4 to the LU inside the STR2 and stores in a disk pool management table 131 of an SM 13 information concerning the LU, i.e., "Archive Storage" as the storage class #, "STR2" as the storage node #4' SATA pool" as the disk pool #, "LU4" as the LU #, "remote block" as the LU type, "RAID 5, 15D+1P" as the RAID Conf., and "2100 GB" as the usable capacity. When the CHN (1100) of the STR0 executes a file system program, the disk pool management table 131 is referred to and the information concerning the LU is copied from the disk pool management table 131 to a storage class management table 1100451 in a file access control memory.

As in the second embodiment, it is assumed that a migration management section 110043A of the CHN0 (1100) of the STR0 has decided to migrate a file abc.doc from a NearLine Storage class to the Archive Storage class, and the following is a description of the migration processing of the file executed based on this assumption.

The migration management section 110043A of the STR0 refers to a storage class management table 1100439, selects the LU4 that belongs to the "Archive Storage" class, and decides to transfer the file abc.doc to the LU4. The LU4 has attributes of "STR2 (i.e., the other storage device 1b)" as its storage node, "SATA disk pool' as its disk pool #, and "remote block" as its LU type.

Unlike the second embodiment, since the LU type of the LU4 is "block" type, there is no file system in the LU4. For this reason, the file system program stored in the CHN0 (1100) constructs a local file system LFS4 in the LU4. Due to the fact that the disk pool in which the LU4 is set resides in the other storage device STR2 from the perspective of the STR0, it is therefore a "remote" disk pool and the LU4 is a remote LU; however, since the file system LFS4 set in the LU4 is to be controlled by the CHN0 (1100), the file system LFS4 is managed as a local file system.

Due to the fact that the LFS4 is to be managed as a local file system and the LU4 in which the LFS4 is constructed is an LU that is in the block type, divergent storage device, a file storage management table is treated differently in the present embodiment compared to its treatment in the first and the second embodiments. In other words, a file storage management section 1100433 of the CHN0 (1100) of the STR0 assigns "STR2" as the link destination node name, "LFS4" as the link destination FS name, and a STR2-FILE00001 as the link destination filename, and sets these in a file storage management table for the file abc.doc. Since the file abc.doc has already being migrated to the LU2 under the filename FILE00001, the CHN0 (1100) can alternatively set the assigned link destination node name, the link destination FS name and the link destination filename in the file storage management table for the file FILE00001 in the LFS2. Since the STR2, in which the LU4 actually exists, does not execute the file access control as described earlier, a file storage management table for the STR2-FILE00001 is not created in the STR2.

The processing that takes place when the file system program 110043 of the CHN0 (1100) is executed is the same as the processing that takes place on the local file system according to the first embodiment in terms of the file open processing, write processing and migration processing, except for the fact that the processing is executed with the awareness that the link destination node of the file abc.doc (i.e., the storage device in which the actual data of the file abc.doc is stored) is the STR2.

However, unlike the first embodiment in which a file is transferred to an LU that is in the primary storage device STR0, data of a file is transferred to an LU that is in the other storage device STR2 according to the present embodiment, which results in input/output processing to and from disks that is different from the first embodiment. While the DKA 12x of the STR0 controlled the input/output processing to and from disks in the first embodiment, the CHF 1 (1111) of the STR0 controls the processing according to the configuration of the present embodiment. For this reason, a CHF communications driver program 110096 is stored in a disk array control memory 11009 of the CHN0. A CHF communications driver section is realized by having a disk array control CPU 11008 execute the CHF communications driver program 110096. The CHF communications driver section sends a disk input/output command (hereinafter called an "I/O command") to the SM 13. Address information representing storage positions of the data is included in the I/O command. The CHF1 (1111) receives the I/O command via the SM 13 and based on the I/O command received issues an I/O command to the storage device 1b (STR2) via the SAN 35. The I/O command issued by the CHF1 (1111) includes address information representing the data storage positions within the storage device 1b (STR2). The storage device 1b (STR2) processes the I/O command received from the CHF1 (1111) according to the same procedure applied when a disk I/O command is received from a normal host. In other words, the CHF1 of the STR0 is recognized as a host from the perspective of the STR2.

According to the present embodiment, the disk pool of the divergent storage device STR2 provided with the block I/O interface can be treated as one of the disk pools of the storage device STR0, and a file system managed by the STR0 can be constructed on the LU that is in the disk pool of the STR2. Furthermore, due to the fact that files stored in the LU of the STR0 can be migrated to the LU within the STR2, a flexible storage hierarchy with superior cost effectiveness can be constructed.

EMBODIMENT 4

Figure 15:
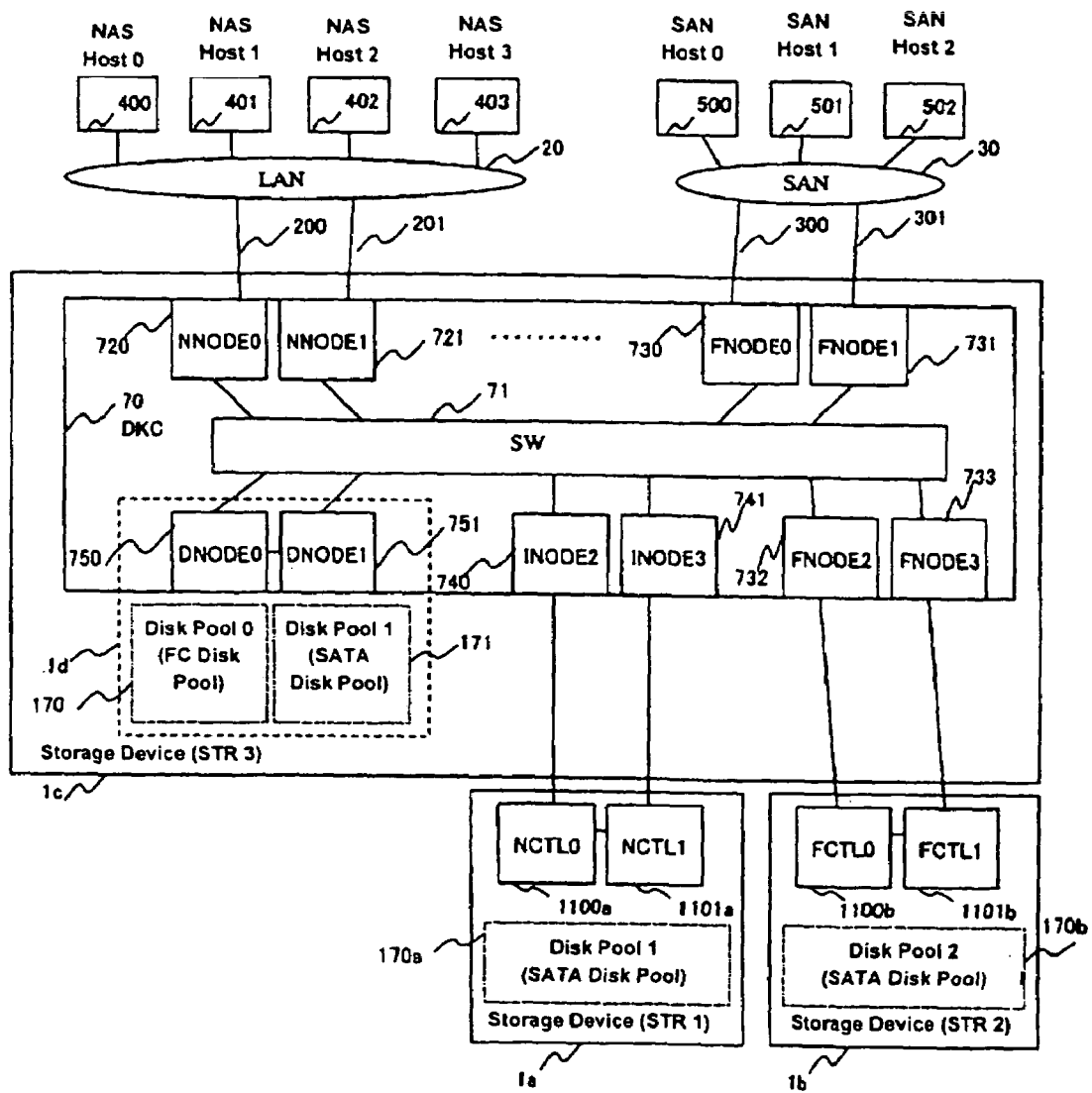
FIG. 15 is a diagram of an example of the fourth configuration of the system in accordance with another embodiment the present invention.

(1) Example of System Configuration (FIG. 15)

The following is a description of the fourth embodiment. The present embodiment differs from preceding embodiments in its configuration.

FIG. 15 is a diagram of an example of the system configuration according to the present embodiment. A storage device STR3 (1c) is provided with a DKC 70 and disk pools. In the DKC 70, an SW 71 is a switch, NNODEs (72x) are NAS nodes each provided with a file I/O control mechanism to connect with a LAN, FNODEs (73x) are FC nodes each provided with a block I/O control mechanism to connect with a SAN, INODEs (74x) are IP nodes each provided with an IP network control mechanism to connect with an IP network, and DNODEs (75x) are disk controller nodes each provided with a disk control mechanism to connect with a disk pool. To the switch SW 71 are connected one or more NNODEs 72x, one or more FNODEs 73x, one or more INODEs 74x and one or more DNODEs 75x. A node to control iSCSI can be connected to the switch SW 71 to form an IP SAN. The node to control the iSCSI would have functions and a configuration similar to those of the FNODE.

The DNODE0 and the DNODE1 are connected to and control two types of disk pools, a disk pool 0 and a disk pool 1, which are an FC disk pool 170 and a SATA disk pool 171.

The INODE2 and the INODE3 are connected to a NAS-type divergent storage device STR1 (1a), which is external to the storage device STR3 and is a storage device provided with file I/O interfaces described in the second embodiment. The FNODE2 and the FNODE3 are connected to a SAN-type divergent storage device STR2 (1b), which is external to the storage device STR3 and is a storage device provided with block I/O interfaces described in the third embodiment.

Figure 16:
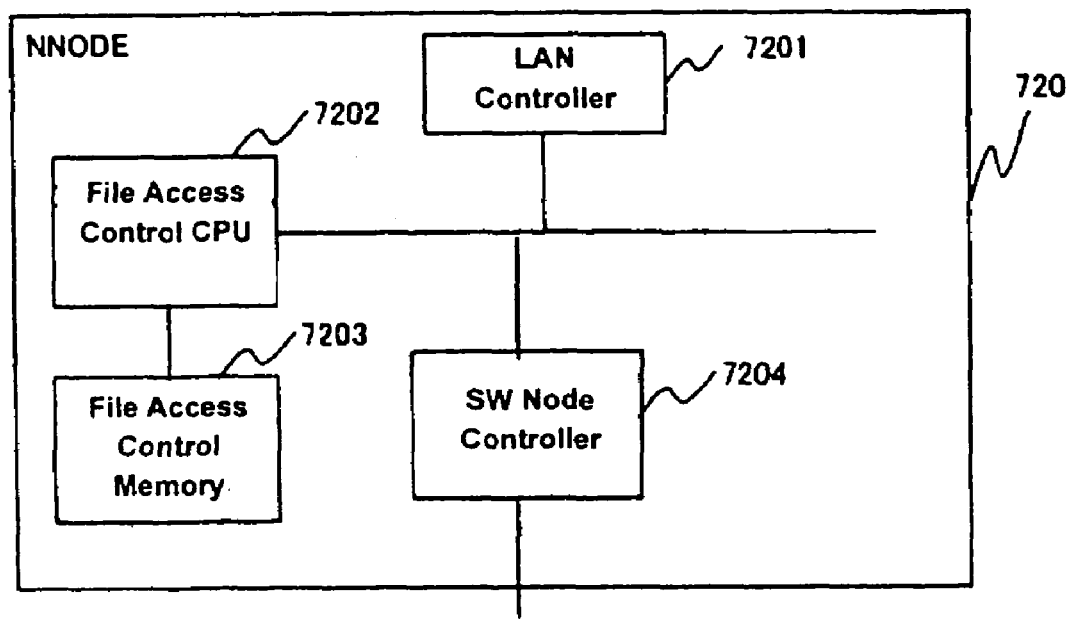
FIG. 16 is a diagram of a configuration example of a NAS node.

(2) Example of Configuration of the NNODE (FIG. 16)

FIG. 16 is a diagram of an example of the configuration of the NNODE. The NNODE 720 is equivalent to the CHN 1100 shown in FIG. 4 with the inter-CPU communications circuit 11007 and components below it removed and replaced by an SW node controller 7204. Other components are the same as in the CHN 1100 in terms of configuration and function.

The SW node controller 7204 is a controller circuit for connecting with the SW 71; it forms commands, data and controller information in internal frame formats that are sent and received within the storage device STR3 (1c) and sent as disk I/O to other nodes such as the DNODEs.

Figure 17:
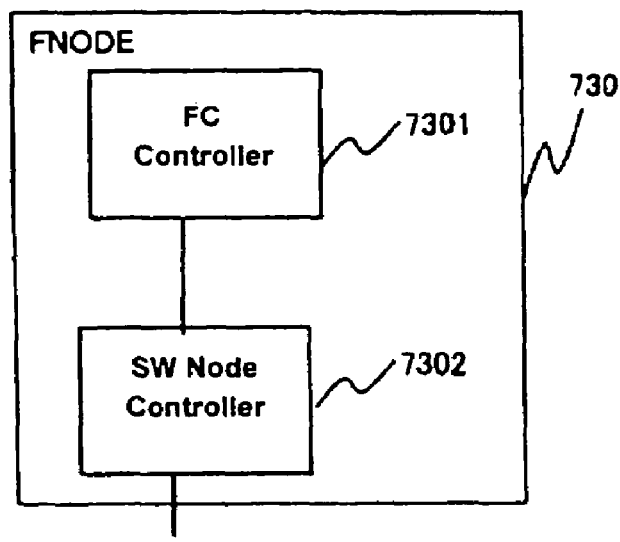
FIG. 17 is a diagram of a configuration example of a Fibre Channel node.

(3) Example of Configuration of the FNODE (FIG. 17)

FIG. 17 is a diagram of an example of the configuration of the FNODE. The FNODE 730 has a configuration in which an SW node controller 7302 is connected to the FC controller 11012b of the FCTL 1100b in FIG. 14, which makes the FNODE 730 capable of connecting with the SW 71 via the SW node controller 7302. An FC controller 7301 operates as a target device and sends and receives frames of commands, data and controller information to and from the SAN. The SW node controller 7302 converts frames sent or received by the FC controller 7301 into internal frame configurations of the storage device STR3 (1c) and sends or receives the converted frames to and from other nodes, such as the DNODEs.

The FNODE 73x operates as an initiator device and based on disk I/O commands received from the NNODEs or other FNODEs can send I/O commands to other storage devices connected externally to the storage device STR3. For example, based on commands received from the NNODEs or other FNODEs of the storage device STR3, the FNODE2 and the FNODE3 in FIG. 15 can send I/O commands to the divergent storage device STR2 (1b) externally connected to the storage device STR3. In this case, the FNODE2 and the FNODE3 appear to be operating as host computers from the perspective of the STR2.

Although only the FC controller 7301 and the SW node controller 7302 are shown in FIG. 17 for the sake of simplification, a CPU can be mounted on the FNODEs in order to perform target processing, initiator processing or internal frame generation processing.

By installing an iSCSI controller instead of the FC controller 7301, a node that controls iSCSI can be configured; by connecting such a node to the SW 71, an IP SAN can be configured.

Figure 18:
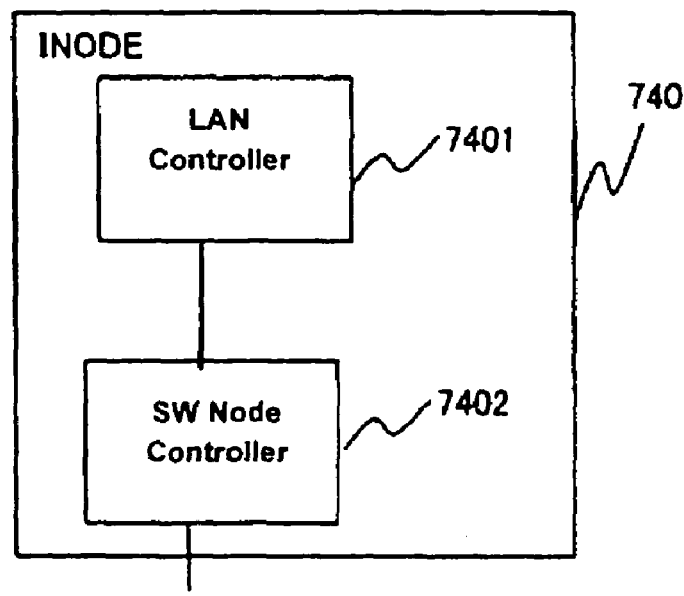
FIG. 18 is a diagram of a configuration example of an IP node.

(4) Example of Configuration of INODE (FIG. 18)

FIG. 18 is a diagram of an example of the configuration of the INODE. The INODE 740 has a configuration in which an SW node controller 7402 is connected to a LAN controller 7401, which is similar to the LAN controller 11002a of the NCTL0 (1100a) in FIG. 13; this configuration makes the INODE 740 capable of connecting with the SW 71 via the SW node controller 7402. The INODEs are provided on the storage device STR3 (1c) in order to connect the external NAS-type storage device STR1a to the STR3.

Figure 19:
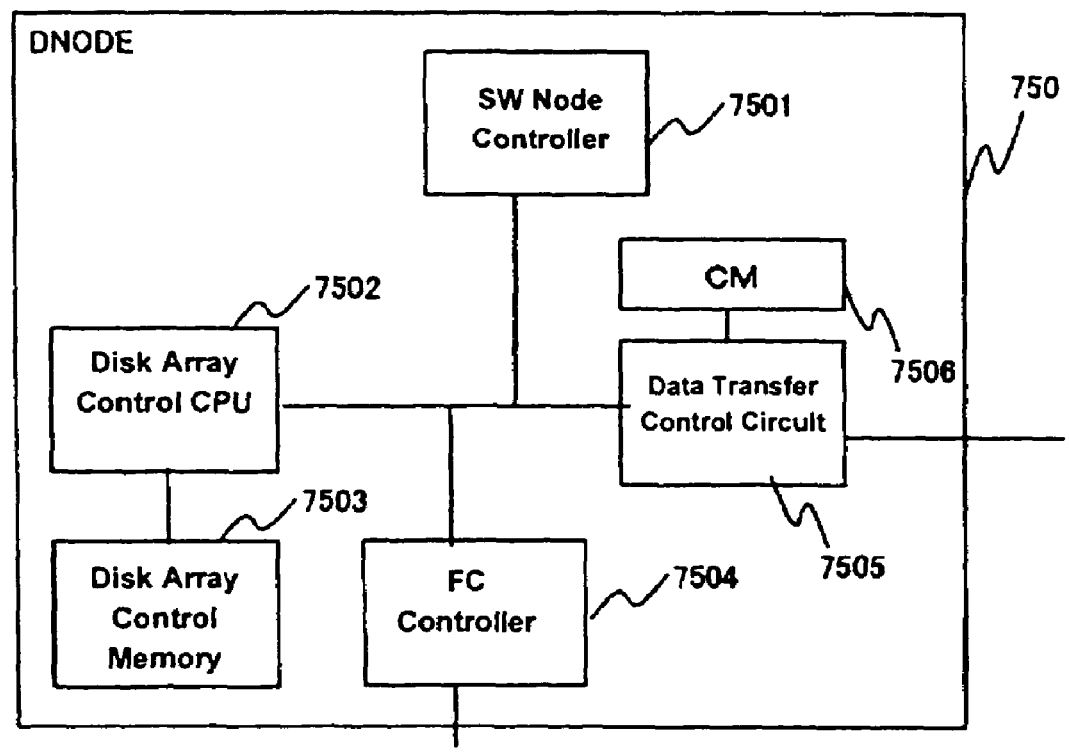
FIG. 19 is a diagram of a configuration example of a disk array node.

(5) Example of Configuration of DNODE (FIG. 19)

FIG. 19 is a diagram of an example of the configuration of the DNODE. The DNODE 750 is similar to the FCTL 1100b in FIG. 14, but with the FC controller 11012b removed and replaced with an SW node controller 7501. The DNODE 750 goes into operation when it receives a disk I/O command from one of the NNODEs or FNODEs via the SW 71; as a result, a section 1d outlined by a broken line in FIG. 15 operates as if it were the independent storage device STR2 in FIG. 14. In the present embodiment, the DNODE0 (750) and the DNODE1 (751) form a pair of redundant controllers. Having redundant DNODEs is similar to the configuration of the storage device STR2 in FIG. 14, where there are also redundant FCTLs.

(6) Migration Processing of Files

The present embodiment only differs from the first, second and third embodiments in its configuration of the storage device, and its processing procedure for executing a hierarchical storage control is similar to that in the first, second and third embodiments; accordingly, only those parts that differ in the operation as a result of differences in the configuration of the storage device are described below.

In the present embodiment, a hierarchical storage control inside the storage device STRS can be executed using a procedure similar to that in the first embodiment. A file system program 110043 stored in a file access control memory of the NNODE 72x is equipped with a storage class management table 1100439 for managing usable LUs, and can recognize disk pools and LUs managed by the DNODEs 75x by referring to the storage class management table 1100439. However, unlike the first embodiment, there is no SM 13 for storing shared information; consequently, the NNODE 72x must query all DNODEs 75x in advance to specify a usable LU and register it in the storage class management table 1100439. Of course, an SM node for connecting with an SM can be provided for connection with the SW 71 in the present embodiment, so that the storage class management table 1100439 can consist of information stored in the SM, as in the first embodiment.

When the NNODE 72x specifies a usable disk pool and an LU, creates the storage class management table 1100439, and defines a storage class, a processing similar to that in the first embodiment can be applied subsequently to execute a hierarchical storage control within the storage device STR3 (1 c), i.e., a hierarchical storage control using LUs set in the disk pool 0 and the disk pool 1.

To issue a disk I/O command, an SW node driver program stored in the file access control memory 7203 of the NNODE is executed by the file access control CPU 7202, which causes a disk I/O command to be issued via the SW node to the DNODE 750 that manages the LU that is the subject of access.

Through the configuration and processing described above, a system in which a file-based storage hierarchy is constructed within the storage device STR3, as in the first embodiment, can be realized.

Furthermore, the NAS-type divergent storage device STR1 (1a) provided with file I/O interfaces can be connected externally to the storage device STR3, which would result in a configuration of a storage hierarchy as in the second embodiment. When the file system program 110043 stored in the file access control memory 7203 of the NNODE 72x is executed by the file access control CPU 7202, the file system program 110043 queries the INODE 74x whether there is a NAS-type divergent storage device connected to the INODE 74x; if there is a divergent storage device connected, the file system program 110043 obtains from the divergent storage device the information for identifying remote LUs and remote file systems that are in the divergent storage device. Through a control by the file access control CPU 7202, a storage class is defined for each of the remote LUs and the remote file systems, and information concerning the LUs is registered and managed in the storage class management table 1100439. Subsequent steps are the same as in the processing procedure in the second embodiment.

To issue a disk I/O command, the SW node driver program stored in the file access control memory 7203 of the NNODE is executed by the file access control CPU 7202, which causes a disk I/O command to be issued from the NNODE via the SW node to the INODE 740 connected to the storage device STR1 (1a) that is provided with the LU that is the subject of access. Based on the I/O command received, the INODE 740 issues to the storage device STR1 (1a) a disk I/O command for a file access, as well as sends and receives actual data of the file and control information to and from the STR1 (1a).

The INODEs 74x have no involvement whatsoever in the file control information and operate simply as gateways of an IP network. In such a case, a hierarchical storage configuration without any interference from other devices, such as NAS hosts, can be realized. Of course, the divergent storage device STR1 (1a) can be connected to the LAN 20, to which the NNODE 720 is connected, as in the second embodiment.

Through the configuration and processing described above, a file-based storage hierarchy that utilizes storage pools of an external divergent storage device, as in the second embodiment, can be realized.

Furthermore, the SANtype divergent storage device STR2 (1b), which is a storage device provided with block I/O interfaces, could be connected externally to the storage device STR3, which would result in a configuration of a storage hierarchy as in the third embodiment. When the file system program 110043 stored in the file access control memory 7203 of the NNODE 72x is executed by the file access control CPU 7202, the NNODE queries the FNODEs 73x whether there is a SAN-type divergent storage device connected to the FNODEs 73x. If there is a divergent storage device connected, the NNODE recognizes remote LUs of the divergent storage device based on the contents of the response from the FNODEs 73x to the query and constructs local file systems in the remote LUs. The NNODE then defines a storage class for each of the remote LUs and the local file systems, and registers and manages information concerning the LUs in the storage class management table 1100439. Subsequent steps are the same as in the third embodiment.

To issue a disk I/O command, the SW node driver program is executed by the file access control CPU 7202, which causes a disk I/O command to be issued from the NNODE via the SW node to the FNODE 732 connected to the storage device STR2 (1b), which is provided with the LU that is the subject of access. The FNODE 732 issues to the storage device STR2 a disk I/O command, as well as sends and receives data and control information to and from the STR2. Through the configuration and processing procedure described above, a file-based storage hierarchy that utilizes a file system that is constructed in an external storage device STR2 as in the third embodiment and managed by the STR3 can be realized.

According to the present embodiment, the storage device STR3 behaves as if it were a central control controller for constructing a hierarchy storage system and various types of storage devices can be connected internally and externally to the storage device STR3; consequently, an extremely flexible, scalable and large-scale hierarchical storage system can be constructed. Furthermore, due to the fact that disks and other storage devices can be connected internally and externally to the storage device STR3 as nodes on the SW 71 of the storage device STR3, high-speed data transfer becomes possible.

(7) Other Applications

Although file transfer methods and storage devices that execute hierarchical migration processing of files based on file's data life cycle stages have been described in the first through fourth embodiments, files can be transferred based on other standards and a plurality of standards can be combined. Possible standards other than the data life cycle stage include a file's access property and an LU's used capacity. In such cases, transfer of files can be controlled by providing a migration plan based on the file's access property or the LU's used capacity.

Examples of migration plans based on a file's access property include a plan to re-transfer a file into a storage class one class higher in the hierarchy when the access frequency of the file exceeds a certain level, or a plan that provides a storage class specialized for sequential accesses and that transfers a file into the specialized storage class once the sequential access frequency to the file exceeds a certain level.

Examples of migration plans based on an LU's used capacity include a plan to transfer a file to a storage class one class lower in the hierarchy even if its current life cycle stage has not shifted, if the file that is stored in an LU has low access frequency or if a long time has elapsed since its date of creation, once the used capacity of the LU exceeds a certain level.

The file property information management table 1100438 in the above embodiments manages dynamic properties for each file as access information. The storage class management table 1100439 manages the total capacity and used capacity of each LU. By utilizing such information, migration plans described above can be readily realized.

A hierarchical storage control according to the property of a file can be realized through a processing within a storage device and without being dependent on host computers.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A system for storing data of files comprising:
    a first storage system having a first logical unit configured by a plurality of first disk devices, a second logical unit configured by a plurality of second disk devices, and a first controller coupled to the plurality of first disk devices and the plurality of second disk devices, characteristics of the first logical unit being different from characteristics of the second logical unit, and
    a controller coupled to the first storage system, managing a first file system configured in the first logical unit and a second file system configured in the second logical unit as local file systems, and managing data objects stored in the first logical unit and the second logical unit as files,
    wherein the controller defines storage classes of the first logical unit and the second logical unit based on the characteristics of the first logical unit and the second logical unit,
    wherein based on the storage classes and a storing condition for determining a storing location of a certain file to be stored in the system, the controller determines the first logical unit as the storing location of the certain file and controls to store data of the certain file in the first logical unit,
    wherein when a second storage system having a third logical unit configured by a plurality of third disk devices and a second controller coupled to the plurality of third disk devices is coupled to the controller, the controller detects the second storage system and obtains characteristics information of the third logical unit,
    wherein the controller defines a storage class of the third logical unit based on the characteristics information of the third logical unit,
    wherein the controller determines whether or not a third file system is configured in the third logical unit based on the characteristic information, and
    wherein if the third file system is configured in the third logical unit by the second storage system, the controller manages the third file system as a remote file system, and controls a migration operation of the certain file from the first file system to the third file system based on the storage class of the third logical unit and a migration condition for the certain file.

2. A system for storing data of files according to claim 1, wherein if the third file system is not configured in the third logical unit by the second storage system, the controller configures a fourth file system in the third logical unit and manages the fourth file system as a local file system, and
    wherein the controller controls a migration operation of data of the certain file from the first logical unit to the third logical unit based on the storage class of the third logical unit and the migration condition for the certain file.

3. A system for storing data of files according to claim 1, wherein the controller issues a request to the second storage system for obtaining the characteristics information of the third logical unit, and obtains the characteristics information indicating whether or not the third file system is configured in the third logical unit in response to the request.

4. A system for storing data of files according to claim 1,
    wherein the second controller defines the storage class of the third logical unit,
    wherein when the certain file is migrated from the first file system to the third file system, the controller transmits information indicating the migration condition for the certain file to the second controller, and
    wherein the second controller determines the third logical unit as a location for storing data of the certain file based on the storage class defined by the second controller and the information indicating the migration condition for the certain file.

5. A system for storing data of files according to claim 1, wherein the plurality of first disk devices are Fibre Channel (FC) disk devices,
    wherein the plurality of second disk devices and the plurality of third disk devices are Advanced Technology Attachment (ATA) disk devices, and
    wherein the controller defines different storage classes for the first logical unit and the third logical unit based on types of disk devices configuring the first logical unit and the third logical unit.

6. A system for storing data of files according to claim 5,
    wherein the controller issues a request to the second storage system to obtain the characteristics information of the third logical unit,
    wherein the characteristics information including information indicating a type of the plurality of third disk devices configuring the third logical unit, and
    wherein the controller defines the storage class for the third logical unit based on the type of the plurality of third disk devices.

7. A system for storing data of files according to claim 1,
    wherein the storing condition for the certain file and the migration condition for the certain file are determined based on an application creating the certain file.

8. A system for storing data of files comprising;
    a first storage system having a first logical unit configured by a plurality of first disk devices and a first controller coupled to the plurality of first disk devices, and
    a controller coupled to the first storage system, managing a first file system configured in the first logical unit and managing data objects stored in the first logical unit as files,
    wherein when a second storage system having a second logical unit configured by a plurality of second disk devices and a second controller coupled to the plurality of second disk devices is coupled to the controller, the controller detects the second storage system, and obtains characteristics information of the second logical unit,
    wherein the controller determines whether or not a second file system is configured in the second logical unit based on the characteristics information,
    wherein if the second file system is configured in the second logical unit by the second storage system, the controller manages the second file system as a remote file system, and controls a migration operation of a certain file from the first file system to the second file system, and wherein if the second file system is not configured in the second logical unit by the second storage system, the controller configures a third file system in the second logical unit, manages the third file system as a local file system, and controls a migration operation of data of the certain file from the first logical unit to the second logical unit.

9. A system for storing data of files according to claim 8, wherein the controller issues a request to the second storage system for obtaining the characteristics information of the second logical unit, and obtains the characteristics information indicating whether or not the second file system is configured in the second logical unit in response to the request.

* * * * *